(12) United States Patent
Kuriyama et al.

(10) Patent No.: US 12,496,803 B2
(45) Date of Patent: Dec. 16, 2025

(54) MULTILAYER MAGNETIC SHEET

(71) Applicant: PROTERIAL, LTD., Tokyo (JP)

(72) Inventors: Yasuo Kuriyama, Tokyo (JP); Kouhei Miyano, Tokyo (JP); Yuichi Ogawa, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 369 days.

(21) Appl. No.: 18/118,812

(22) Filed: Mar. 8, 2023

(65) Prior Publication Data

US 2023/0321950 A1    Oct. 12, 2023

(30) Foreign Application Priority Data

Apr. 8, 2022  (JP) ................. 2022-064699

(51) Int. Cl.
*B32B 7/025* (2019.01)
*B32B 7/12* (2006.01)
*B32B 15/08* (2006.01)

(52) U.S. Cl.
CPC ............ *B32B 7/025* (2019.01); *B32B 7/12* (2013.01); *B32B 15/08* (2013.01); *B32B 2250/05* (2013.01); *B32B 2307/208* (2013.01); *B32B 2307/7376* (2023.05); *B32B 2311/30* (2013.01); *B32B 2457/00* (2013.01)

(58) Field of Classification Search
CPC .. B32B 7/00–7/14; B32B 15/00–15/20; B32B 3/00–3/30
See application file for complete search history.

(56) References Cited

U.S. PATENT DOCUMENTS

| | | |
|---|---|---|
| 2007/0040643 A1 | 2/2007 | Inoue et al. |
| 2015/0123604 A1 | 5/2015 | Lee et al. |
| 2019/0027302 A1 | 1/2019 | Noh et al. |
| 2019/0296432 A1 | 9/2019 | Lim et al. |
| 2022/0293313 A1 | 9/2022 | Kuriyama |
| 2022/0298593 A1 | 9/2022 | Kuriyama |

FOREIGN PATENT DOCUMENTS

| | | |
|---|---|---|
| CN | 209087527 U | 7/2019 |
| JP | H0410698 A | 1/1992 |
| JP | H06140783 A | 5/1994 |
| JP | H06140785 A | 5/1994 |
| JP | 2008112830 A | 5/2008 |

(Continued)

OTHER PUBLICATIONS

Extended European Search Report issued in EP application No. 23159405.2-1212; dated Aug. 25, 2023; 13 pages.

(Continued)

*Primary Examiner* — Prashant J Khatri
(74) *Attorney, Agent, or Firm* — Meunier Carlin & Curfinan LLC

(57) ABSTRACT

A multilayer magnetic sheet comprises laminate substrates. Each of the laminate substrates is formed in a band shape having a short side and a long side and comprises magnetic strips stacked in layers. The laminate substrates are aligned and arranged in a plate shape in a direction, in which the long sides are adjacent to each other and the short sides extend. The laminate substrates aligned and arranged in the plate shape are stacked in layers in a thickness direction of the laminate substrates. Long side portions of the laminate substrates including the long sides and vicinities of the long sides overlap each other.

16 Claims, 22 Drawing Sheets

(56) References Cited

FOREIGN PATENT DOCUMENTS

| | | | |
|---|---|---|---|
| JP | 2008529266 | A | 7/2008 |
| JP | 2015505166 | A | 2/2015 |
| JP | 2019522355 | A | 8/2019 |
| WO | 2020235642 | A1 | 11/2020 |

OTHER PUBLICATIONS

Non-Final Office Action mailed Oct. 5, 2023, in U.S. Appl. No. 18/295,561; 9 pages.
Office Action issued in Japanese Patent Application No. 2022-064699, dated Oct. 21, 2025, machine English translation provided, 10 pages.
Non-Final Office Action issued in U.S. Appl. No. 18/297,071, dated Oct. 10, 2025.
Office Action issued in Japanese Patent Application No. 2022-064700, dated Oct. 20, 2025, machine English translation provided, 11 pages.
Office Action issued in Japanese Patent Application No. 2022-064701, dated Oct. 21, 2025, machine English translation provided, 15 pages.

MULTILAYER MAGNETIC SHEET

CROSS-REFERENCE TO RELATED APPLICATIONS

The present application claims priority based on Japanese Patent Application No. 2022-064699 filed to the Japanese Patent Office on Apr. 8, 2022, and the content of Japanese Patent Application No. 2022-064699 is incorporated herein by reference in its entirety.

BACKGROUND

The present disclosure relates to a multilayer magnetic sheet that can be used in, for example, a contactless charging device for charging a secondary battery of an automobile.

In recent years, attention has been focused on contactless charging in which a transmission coil is provided on each of a power supply side and a power reception side and charging is performed by power transmission using electromagnetic induction. In the contactless charging, a magnetic flux generated in a primary transmission coil of a power feeding device generates an electromotive force in a secondary transmission coil of a power receiving device through casings of the power feeding device and the power receiving device, whereby a power is supplied.

The contactless charging has been spreading to electronic devices such as a tablet-type information terminal, a music player, a smartphone, and a mobile phone. The contactless charging is a technology applicable to electronic devices in addition to those devices described above, electric vehicles, and drones. The contactless charging is also a technology applicable to a transport vehicle such as a forklift and an automated guided vehicle (AGV), a railway, a tram, and the like.

In order to increase a power transmission efficiency in the contactless charging, a magnetic sheet may be installed as a coil yoke on a side of the transmission coil opposite to contact surfaces of the power feeding device and the power receiving device. The magnetic sheet disposed in this manner has a role as a magnetic shielding material for preventing leakage of the magnetic flux during the charging, a role as a yoke member for refluxing the magnetic flux generated in the coil during the charging, and the like.

As a method for manufacturing the magnetic sheet described above, various methods have been proposed (e.g., see Japanese Unexamined Patent Application Publication No. 2008-112830 (Patent Document 1), Japanese Unexamined Patent Application Publication (Translation of PCT Application) No. 2015-505166 (Patent Document 2), and WO 2020/235642 (Patent Document 3)). Each of Patent Documents 1 to 3 discloses a manufacturing method comprising a step of dividing a thin sheet-shaped magnetic body included in a magnetic sheet, a ribbon of an amorphous alloy or a nanocrystalline grain alloy, or the like (hereinafter referred to also as an "alloy strip") into a plurality of pieces for the purpose of improving a quality (Q) factor or reducing an eddy current loss.

In the case of contactless charging used in an electric vehicle or the like, in comparison with an electronic device such as a smartphone, it is difficult to dispose a primary coil and a secondary coil close to each other. For example, the primary coil and the secondary coil need to be electromagnetically coupled in a state where an interval therebetween is wide in comparison.

Also, a power transmitted between the primary coil and the secondary coil needs to be made large in comparison. Specifically, a current allowed to flow through the primary coil also becomes large in comparison, and the magnetic flux between the primary coil and the secondary coil also needs to be made large.

Thus, the primary coil and the secondary coil become large in comparison, and there has been a problem in that a magnetic sheet used for an electronic device such as a smartphone is insufficient in size. Further, with the magnetic flux becoming large in comparison, there has been a problem in that the magnetic flux tends to leak to other devices.

The alloy strip included in the magnetic sheet has a shape extending in a band shape. There has been a problem in that a width of the alloy strip, which is a dimension in a direction orthogonal to the longitudinal direction, is narrow for contactless charging used in electric vehicles and the like.

In this regard, there is also known a technique of arranging a plurality of alloy strips in a plate shape and further stacking the plurality of alloy strips arranged in the plate shape in a thickness direction (e.g., see Japanese Unexamined Patent Application Publication (Translation of PCT Application) No. 2019-522355 (Patent Document 4)). In the technique described in Patent Document 4, it is easy to increase a width of a surface on which the alloy strips are disposed.

SUMMARY

The technique described in Patent Document 4 is a method of stacking single-layer alloy strips. Hence there has been a problem in that man-hours become large in order to configure a magnetic sheet in which ten or more layers of alloy strips are stacked (hereinafter referred to also as a "multilayer magnetic sheet").

The present disclosure provides a multilayer magnetic sheet inhibiting man-hours from becoming large.

The inventors of the present invention conceived that preparing laminate substrates, each prepared by stacking several magnetic strips, and then arranging and stacking the laminate substrates to produce a multilayer magnetic sheet would be useful for reducing the man-hours for producing the multilayer magnetic sheet. The inventors found that when a multilayer magnetic sheet is produced using laminate substrates, and when magnetic gaps generated between the laminate substrates are continuously generated in a stacking direction, a decrease in a magnetic permeability and a decrease in a Q factor occur. Therefore, the inventors studied a configuration in which magnetic gaps are not continuously formed in the stacking direction and the man-hours are not large, to invent the configuration of the present disclosure.

A multilayer magnetic sheet of the present disclosure comprises laminate substrates. Each of the laminate substrates is formed in a band shape having a short side and a long side and comprises magnetic strips stacked in layers. The laminate substrates are aligned and arranged in a plate shape in a direction, in which the long sides are adjacent to each other and the short sides extend. The laminate substrates aligned and arranged in the plate shape are stacked in layers in a thickness direction of the laminate substrates. In the laminate substrates aligned and arranged in the direction, in which the long sides are adjacent to each other and the short sides extend, long side portions of the laminate substrates including the long sides and vicinities of the long sides overlap each other.

With the multilayer magnetic sheet of the present disclosure, a wide and multilayered magnetic sheet, in which a plurality of laminate substrates with a plurality of magnetic strips stacked therein are aligned in a plate shape and stacked in a thickness direction, is configured. Since the plurality of laminate substrates are aligned in a plate shape and the plurality of plate-shaped laminate substrates are stacked in the thickness direction, the man-hours of manufacturing is less likely to be large compared to a configuration in which magnetic strips are aligned and stacked.

In the plurality of laminate substrates aligned in the direction, in which the long sides are adjacent to each other and the short sides extend, the long side portions of the laminate substrates overlap each other. Hence there is no gap (hereinafter referred to also as a "magnetic gap") between the laminate substrates when viewed in a direction in which the laminate substrates are stacked, and it is thus easy to prevent deterioration of magnetic characteristics of the multilayer magnetic sheet.

The multilayer magnetic sheet of the present disclosure has the configuration in which the plurality of laminate substrates with the magnetic strips stacked therein are aligned in the plate shape and stacked in the thickness direction, and therefore exerts an effect that the man-hours of manufacturing are less likely to increase. Further, the configuration has no gap (magnetic gap) between the laminate substrates when viewed in the direction in which the laminate substrates are stacked, whereby the deterioration of magnetic characteristics of the multilayer magnetic sheet can be easily prevented, and a multilayer magnetic sheet with a high magnetic permeability and a high Q factor can be obtained.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

A multilayer magnetic sheet 400 according to one embodiment of the present disclosure will be described with reference to FIGS. 1 to 12. The multilayer magnetic sheet 400 according to one embodiment is used for a contactless-type charging device. The multilayer magnetic sheet 400 may be used in a power feeding device of a charging device or may be used in a power receiving device.

In the present embodiment, a description will be given by applying the present disclosure to an example in which the multilayer magnetic sheet 400 is used for contactless charging of a device that consumes more power than an information processing device such as a smartphone or an electronic device. For example, a description will be given by applying the present disclosure to an example in which the multilayer magnetic sheet 400 is used for contactless charging of a moving body such as an automobile. Note that the multilayer magnetic sheet 400 may be used for contactless charging of an information processing device, an electronic device, or the like. The multilayer magnetic sheet 400 is also applicable to a transport vehicle such as a forklift and an AGV, a railway, a tram, and the like.

Figure 1:
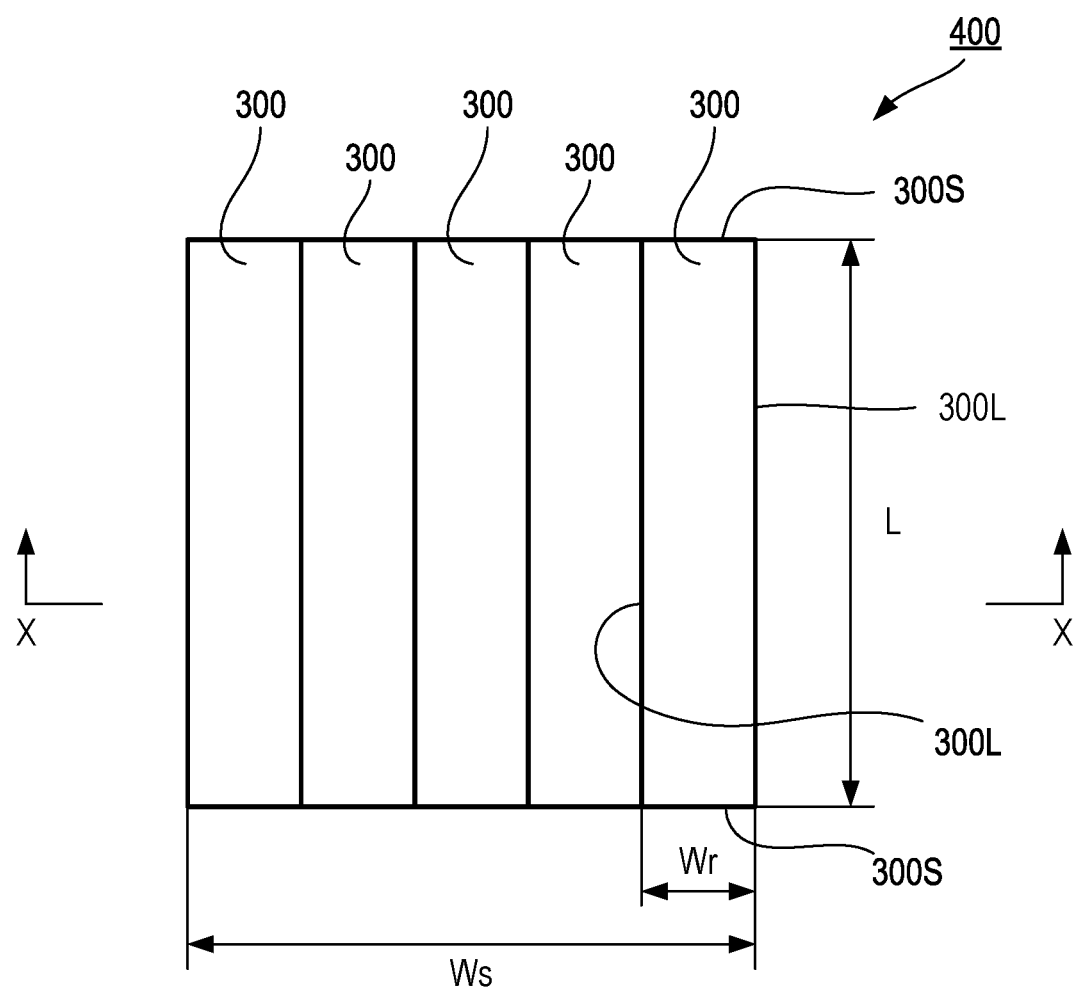
FIG. 1 is a plan view for explaining a structure of a multilayer magnetic sheet according to the present disclosure.
Figure 2:
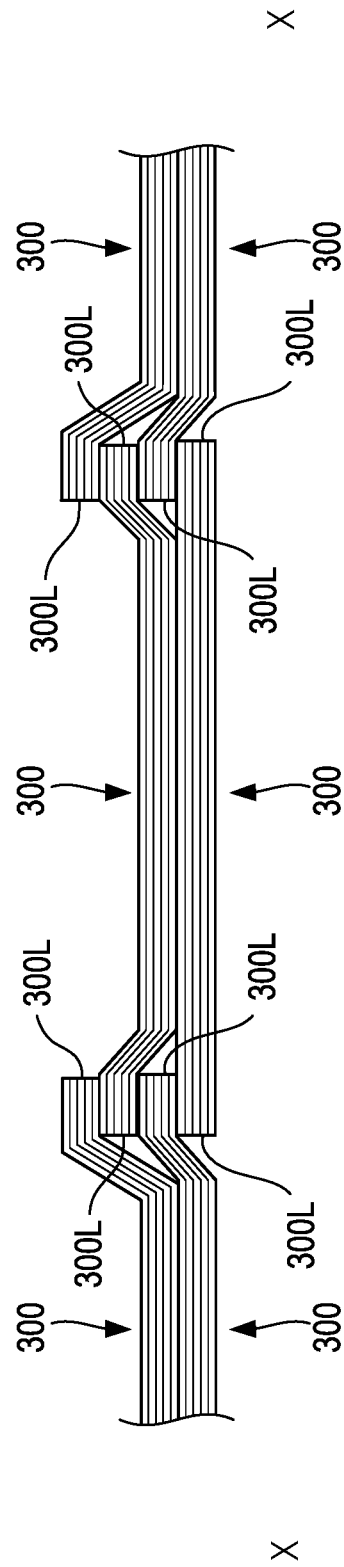
FIG. 2 is a partially enlarged cross-sectional view taken along the line X-X for explaining the structure of the multilayer magnetic sheet.

FIG. 1 is a plan view for explaining a structure of the multilayer magnetic sheet 400. FIG. 2 is a partially enlarged cross-sectional view taken along the line X-X for explaining the structure of the multilayer magnetic sheet 400.

As illustrated in FIGS. 1 and 2, the multilayer magnetic sheet 400 has a configuration in which a plurality of laminate substrates 300 formed in a band shape are aligned and arranged in a plate shape, and the plurality of laminate substrates 300 aligned and arranged in the plate shape are arranged in a stacked manner in a thickness direction.

In addition, as illustrated in FIG. 2, long sides 300L of the laminate substrates 300 arranged side by side and portions in vicinity portions thereof (hereinafter referred to also as "long side portions") overlap each other. In other words, a vicinity portion of the long side 300L of the laminate substrate 300 overlaps in the thickness direction with the adjacent laminate substrate 300 disposed alongside in the plate shape (i.e., disposed alongside in the left-right direction in FIG. 2).

The vicinity portion is a portion where the adjacent laminate substrates 300 overlap and is a portion including the long side 300L of the laminate substrate 300 and extending along the long side 300L. The vicinity portion does not include a portion where the laminate substrate 300 in FIG. 2 is inclined.

The thickness direction is also referred to as a direction in which the laminate substrates 300 are stacked. The laminate substrate 300 has a band shape or a rectangular shape having two long sides 300L and two short sides 300S.

As illustrated in FIG. 1, the multilayer magnetic sheet 400 has a plate shape or a sheet shape formed in a rectangular shape in a plan view. The plurality of laminate substrates 300 are aligned and arranged in a direction in which the short side 300S extends, and the long side portions overlap. In FIG. 1, the overlapping of the long side portions is omitted.

In the multilayer magnetic sheet 400, two or more and 20 or less of the laminate substrates 300 are preferably aligned and arranged in the direction in which the short side 300S extends. Note that 20 or more of the laminate substrates 300 may be aligned and arranged. In the present embodiment, a description will be given by applying the present disclosure to an example in which five laminate substrates 300 are aligned and arranged.

In the present embodiment, a description will be given by applying the present disclosure to an example in which one laminate substrate 300 is disposed in a direction in which the long side 300L extends. Note that the number of the laminate substrates 300 disposed in the direction in which the long side 300L extends may be more than one.

In the present embodiment, a description will be given by applying the present disclosure to an example in which a length L of the laminate substrate 300 in the direction in which the long side 300L extends is in the range of 100 mm or more and 1000 mm or less, and a width Wr in the direction in which the short side 300S extends is in the range of 10 mm or more and 100 mm or less. Note that the length L of the laminate substrate 300 in the direction in which the long side 300L extends may be outside the range described above, and the width Wr of the laminate substrate in the direction in which the short side 300S extends may be outside the range described above. The width Wr in the direction in which the short side 300S extends here is a length when no overlapping has occurred.

In the present embodiment, a description will be given by applying the present disclosure to an example in which the length L of the multilayer magnetic sheet 400 is in the range of 100 mm or more and 1000 mm or less, and the width Ws is in the range of 100 mm or more and 1000 mm or less.

Here, the length L is a dimension in the direction in which the long side 300L of the laminate substrate 300 constituting the multilayer magnetic sheet 400 extends, and the width Ws is a dimension in the direction in which the short side 300S of the laminate substrate 300 extends. Note that the length L of the multilayer magnetic sheet 400 may be outside the range described above, and the width Ws may be outside the range described above.

As illustrated in FIG. 2, the multilayer magnetic sheet 400 has a configuration in which the plurality of laminate substrates 300 are stacked in the thickness direction in a cross-sectional view. A resin sheet may be provided at an upper end or a lower end of the multilayer magnetic sheet 400 in the stacking direction. The resin sheet is a film-shaped member formed using a resin. An amorphous alloy strip, a nanocrystalline alloy strip, another magnetic material, a foil of metal such as aluminum, a resin sheet, or the like may be attached to the upper end or the lower end of the multilayer magnetic sheet 400 in the stacking direction.

The number of the laminate substrates 300 stacked in the thickness direction in the multilayer magnetic sheet 400 is preferably two or more and 20 or less. In the partially enlarged cross-sectional view of FIG. 2, two layers of the laminate substrates 300 are stacked in the thickness direction. With FIG. 2 being a partially enlarged cross-sectional view, two layers are illustrated, but the number of layers of the laminate substrates 300 stacked is not limited to two. The number may be more than three. The number is preferably three or more, more preferably four or more, and still more preferably five or more. The number of the laminate substrates 300 stacked in the thickness direction in the multilayer magnetic sheet 400 may be more than 20 but is preferably 20 or less.

The overlapping of the long side portion (i.e., the dimension of the vicinity portion in the long side portion) of the laminate substrate 300 is preferably 1 mm or more in the dimension in the short side direction. The overlapping is more preferably 2 mm or more. Further, the overlapping is preferably 3 mm or more. An upper limit of the dimension of the overlapping portion is not particularly limited but may be long. For example, the overlapping portion may extend to about half of the lower laminate substrate in the width direction.

The overlapping of the long side portions of the laminate substrates 300 eliminates a magnetic gap generated between the laminate substrates 300 when viewed in the stacking direction to improve magnetic characteristics (e.g., is high and Q is large).

FIG. 2 illustrates an example in which the long sides 300L of the adjacent laminate substrates 300 overlap. Specifically, with respect to the laminate substrate 300 in the first layer (hereinafter referred to also as a "lower layer") at the center in the left-right direction in FIG. 2, each of the laminate substrates 300 disposed in the first layer and disposed on both sides (hereinafter referred to also as "immediate right" and "immediate left") of the laminate substrate 300 at the center is stacked in a state where the long side 300L and the vicinity portion thereof overlap the long side portion of the laminate substrate 300 at the center.

In other words, in the first layer, the stacking is performed such that the long side portion of the laminate substrate 300 disposed at the center and each of the long side portions of the laminate substrates 300 disposed on the left and right overlap in the thickness direction. The long side portions of the laminate substrates 300 disposed on the left and right are overlapped on a second layer side of the laminate substrate 300 disposed at the center.

Further, the laminate substrate 300 in the second layer (hereinafter referred to also as an "upper layer") at the center is stacked on the laminate substrate 300 in the first layer at the center. The stacking is performed such that the long sides 300L and the vicinity portions of the laminate substrate 300 at the center in the second layer overlap the overlapping portions at the long side portions of the laminate substrates 300 on both sides in the first layer.

Further, the laminate substrates 300 on both sides in the second layer are respectively stacked on the laminate substrates 300 on both sides in the first layer. The stacking is performed such that the long sides 300L and the vicinity portions of the laminate substrate 300 on both sides in the second layer overlap the long side portions of the laminate substrate 300 in the second layer at the center.

The overlapping of the long sides 300L of the laminate substrates 300 is not limited to the example illustrated in FIG. 2. For example, the long sides 300L and the vicinity portions of the laminate substrate 300 in the first layer at the center may be overlapped on upper sides (also referred to as second layer sides) of the long sides 300L and the vicinity portions of the laminate substrates 300 in the first layer on both sides.

In the laminate substrate 300 at the center, the left and right long sides 300L and the vicinity portions may be overlapped in different manners. For example, in the laminate substrate 300 at the center in the first layer, the right long side 300L and the vicinity portion may be stacked on the second layer side (i.e., stacked on the upper side) of the laminate substrate 300 on the right side belonging to the first layer, and the left long side 300L and the vicinity portion may be stacked under (i.e., stacked on the lower side of) the long side 300L and the vicinity portion of the laminate substrate 300 on the left side belonging to the first layer.

Figure 3:
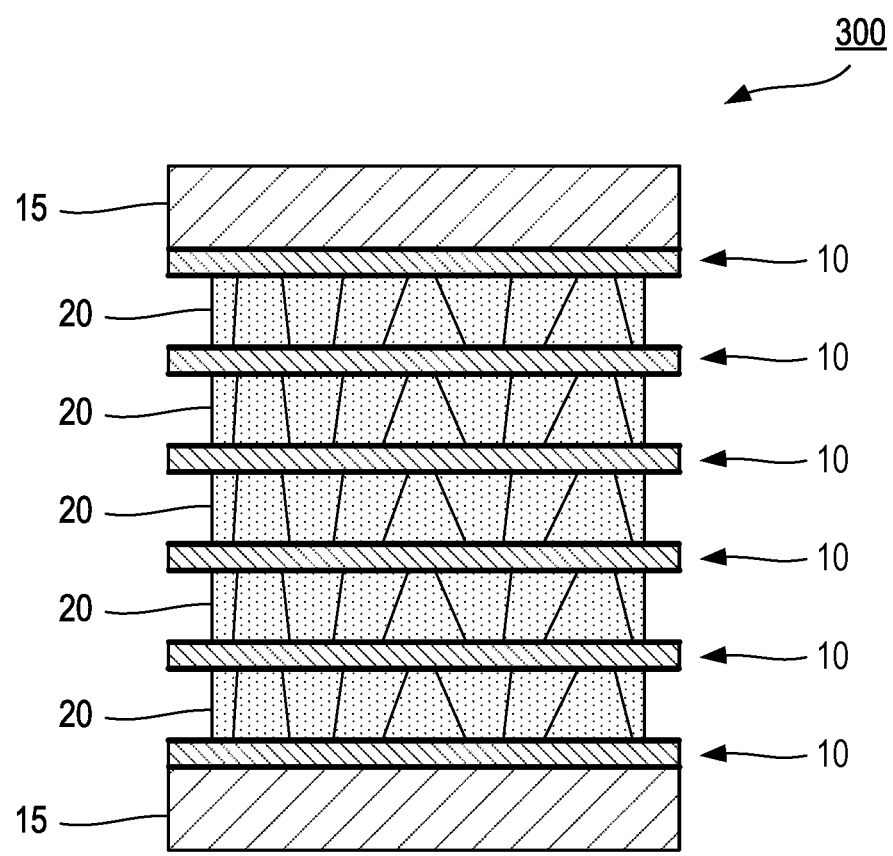
FIG. 3 is a cross-sectional view for explaining a configuration of a laminate substrate.

FIG. 3 is a cross-sectional view for explaining a configuration of the laminate substrate 300. The laminate substrate 300 has a multilayer structure in which a plurality of adhesive layers 10 and a plurality of magnetic strips 20 are stacked alternately. In the present embodiment, as illustrated in FIG. 3, an example of having a multilayer structure in which six adhesive layers 10 and five magnetic strips 20 are alternately stacked will be described.

Specifically, the laminate substrate 300 has a multilayer structure in which the adhesive layer 10, the magnetic strip 20, the adhesive layer 10, the magnetic strip 20, the adhesive layer 10, the magnetic strip 20, the adhesive layer 10, the magnetic strip 20, the adhesive layer 10, the magnetic strip 20, and the adhesive layer 10 are laminated in this order.

In FIG. 3, resin sheets 15 are illustrated above and below the laminate substrate 300, but at the time of stacking of the laminate substrates 300, the stacking is performed with the resin sheets 15 removed as appropriate.

Figure 12:
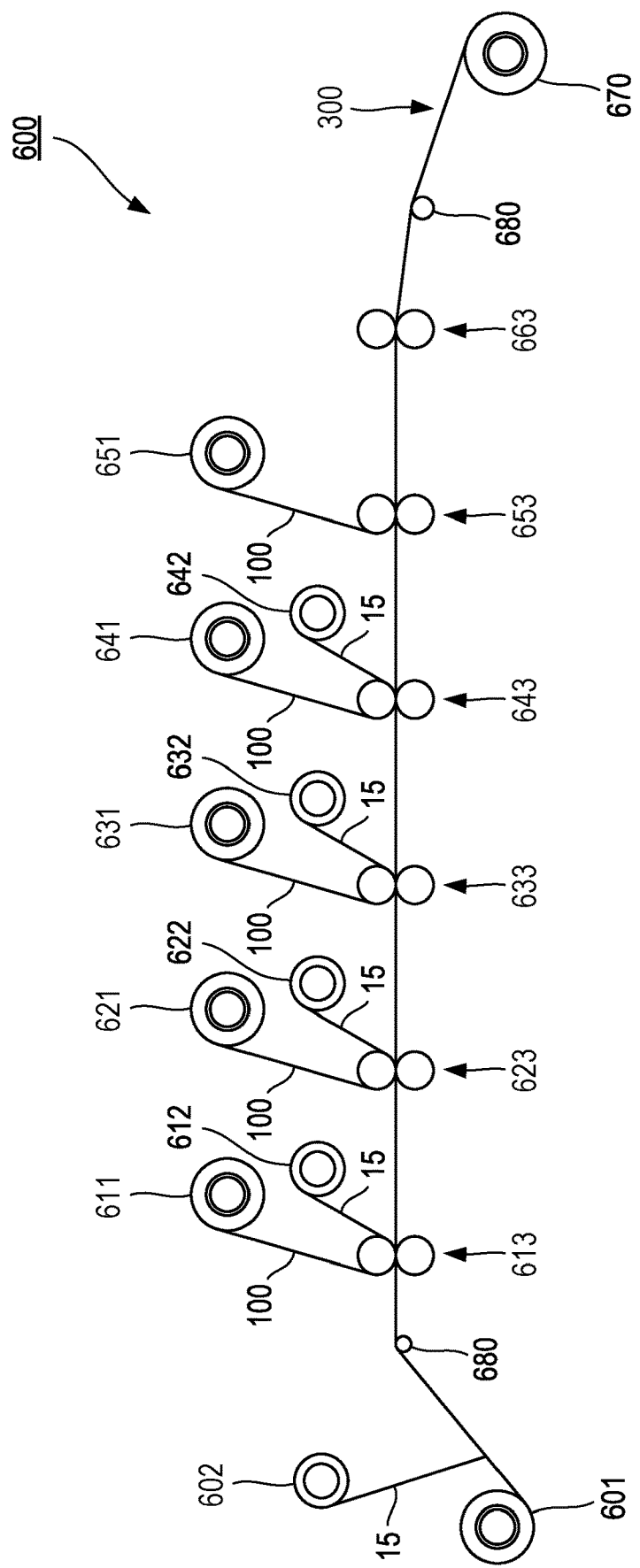
FIG. 12 is a schematic view for explaining a method for manufacturing the laminate substrate.

Note that the number of layers of the magnetic strips 20 included in the laminate substrate 300 may be five as described above, or may be two to four, or any number of six or more. The number of layers of the magnetic strips 20 included in the laminate substrate 300 is preferably three or more, preferably four or more, and preferably five or more. An upper limit of the number of layers may be any number as long as manufacturing is possible. For example, when a manufacturing apparatus described with reference to FIG. 12 is used, the number of layers of the magnetic strips 20 included in the laminate substrate 300 is preferably 20 or less, preferably 15 or less, and preferably ten or less. In consideration of workability in overlapping the long side portions of the laminate substrates 300, the number of layers of the magnetic strips 20 included in the laminate substrate 300 is preferably 20 or less, and preferably 15 or less.

Figure 4:
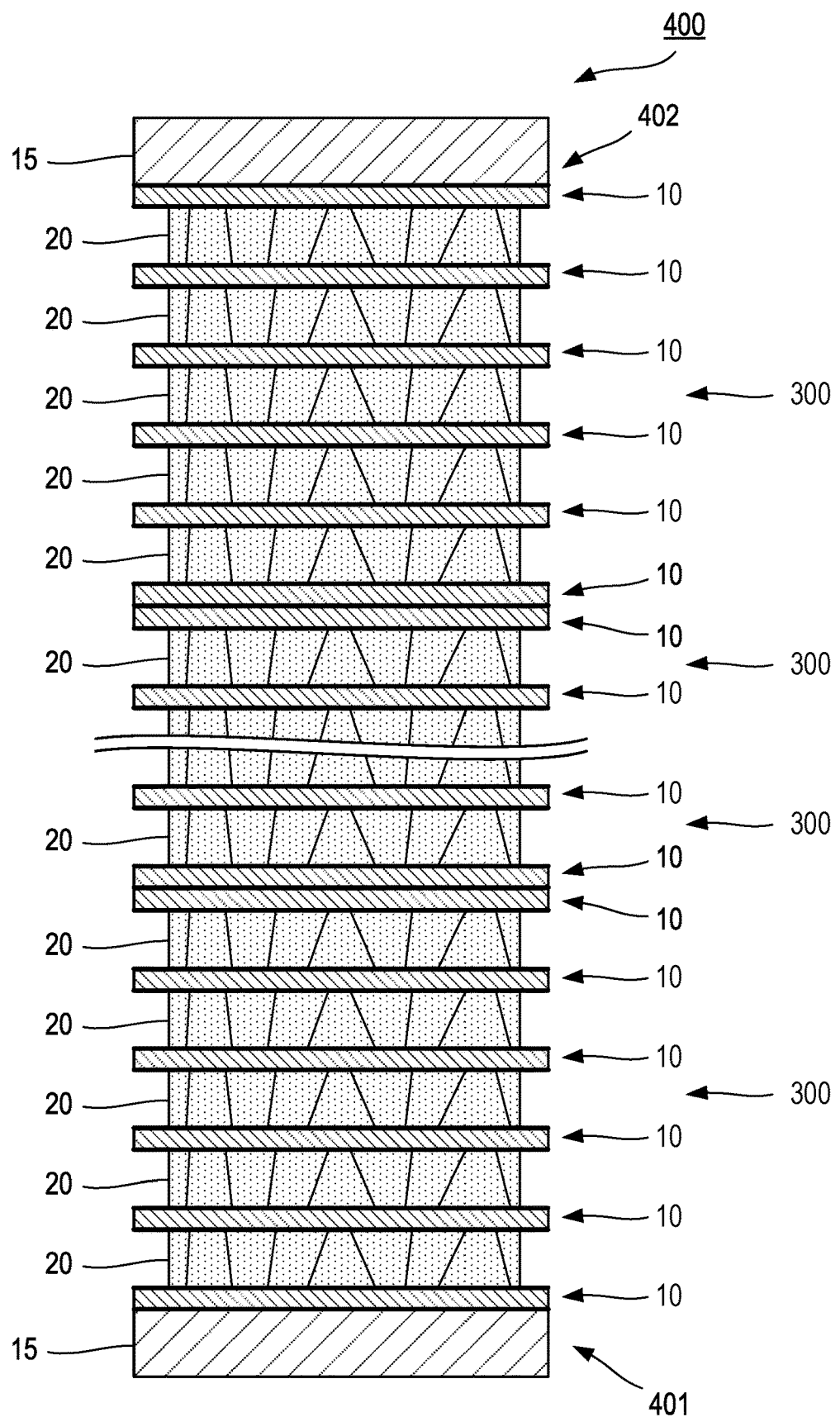
FIG. 4 is a cross-sectional view for explaining the configuration of the multilayer magnetic sheet.

FIG. 4 is a cross-sectional view for explaining a configuration of the multilayer magnetic sheet 400. FIG. 4 illustrates a state in which the laminate substrates 300 are stacked.

Two adhesive layers 10 are stacked successively at a position where the laminate substrates 300 are adjacent to each other. In other portions, two adhesive layers 10 may be stacked. Although three or more layers of the adhesive layer 10 may be stacked, but the entire thickness becomes large. Therefore, two or fewer layer is preferable when the adhesive layers 10 are stacked.

The total of the stacked magnetic strips 20 in the multilayer magnetic sheet 400 can be set as appropriate. For example, the number of layers is preferably ten or more, more preferably 15 or more, more preferably 20 or more, and still more preferably 25 or more. The total of layers of the stacked magnetic strips 20 is preferably 200 or less. The total of layers is preferably 150 or less. The total of layers may be 100 or less.

Figure 5:
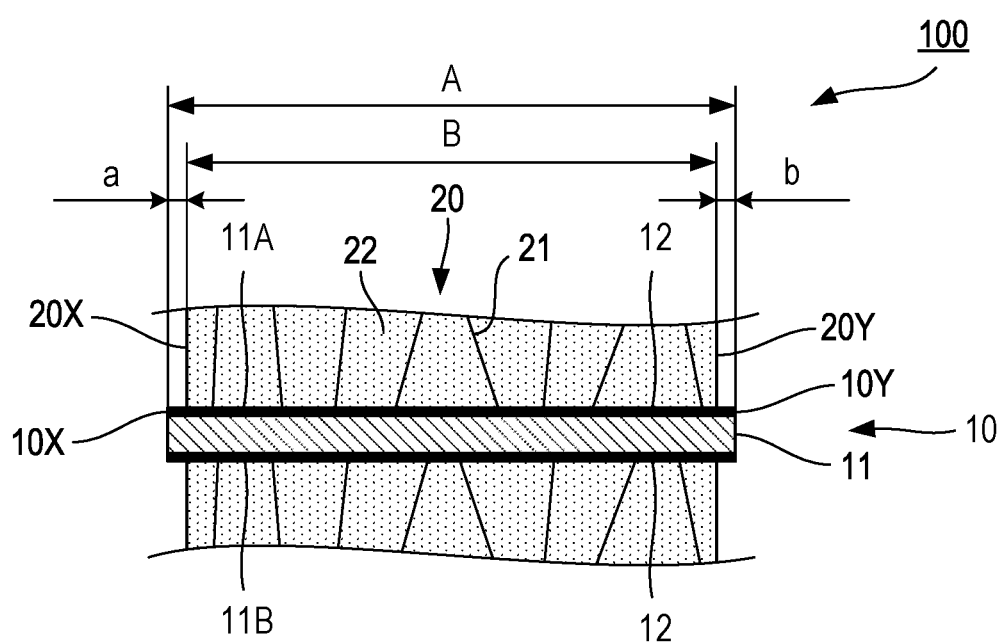
FIG. 5 is a partially enlarged cross-sectional view for explaining a configuration of an adhesive layer and a magnetic strip.

FIG. 5 is a partially enlarged cross-sectional view for explaining a configuration of the adhesive layer 10 and the magnetic strip 20.

As illustrated in FIG. 5, the adhesive layer 10 is a member to which the magnetic strip 20 is attached. Further, the adhesive layer 10 is a member formed in an elongated shape, for example, a film-like member formed in a rectangular shape. The adhesive layer 10 comprises a support 11 and an adhesive 12 as main components.

The support 11 is a band-shaped film member formed in an elongated shape, for example, a film member formed in a rectangular shape. The support 11 is formed using a flexible resin material. As the resin material, polyethyleneterephthalate (PET) can be used.

The adhesive 12 is provided in a film shape or a layer shape on each of a first surface 11A and a second surface 11B of the support 11.

As the adhesive 12, for example, a pressure sensitive adhesive can be used. For example, a known adhesive such as an acrylic adhesive, a silicone-based adhesive, a urethane-based adhesive, a synthetic rubber, or a natural rubber can be used as the adhesive 12. The acrylic adhesive is preferable as the adhesive 12 because acrylic adhesive is excellent in heat resistance and moisture resistance and has a wide range of materials that can be bonded.

The adhesive 12 is provided in a layer shape on each of the first surface 11A and the second surface 11B of the support 11. In the present embodiment, a description will be given by applying the present disclosure to an example in which the adhesive 12 is provided on each of the entire surfaces of the first surface 11A and the second surface 11B of the support 11.

The magnetic strip 20 is a strip formed in an elongated band shape using a magnetic material. Cracks 21 are formed in the magnetic strip 20. The magnetic strip 20 is divided into a plurality of small pieces 22 by the cracks 21. In other words, the magnetic strip 20 comprises a plurality of small pieces 22. The crack 21 refers to a magnetic gap formed in the magnetic strip 20 and includes, for example, a break and/or a fissure of the magnetic strip 20.

By forming the cracks 21 in the magnetic strip 20, the Q factor can be easily improved when the multilayer magnetic sheet 400 is used as a magnetic body for an inductor. When the multilayer magnetic sheet 400 is used as a magnetic body for magnetic shielding, an eddy current loss can be easily reduced by dividing a current path of the magnetic strip 20.

As a material for forming the magnetic strip 20, an alloy with an alloy composition of an Fe-based or Co-based alloy can be used, and a nanocrystalline alloy or an amorphous alloy can be used. The magnetic strip 20 is particularly preferably a strip formed using a nanocrystal alloy as a material (hereinafter referred to also as a "nanocrystalline alloy strip").

As the nanocrystalline alloy strip, it is possible to use a nanocrystalline alloy strip obtained by subjecting an amorphous alloy strip capable of nanocrystallization to a heat treatment for nanocrystallization. At the time of the heat treatment for nanocrystallization, it is preferable to perform the heat treatment for nanocrystallization in a state where tension is applied to the amorphous alloy strip capable of nanocrystallization. Note that a strip formed using an amorphous alloy as a material is also referred to as an "amorphous alloy strip" or a "non-crystalline alloy strip".

The nanocrystalline alloy strip preferably has a composition represented by a following general formula.

General Formula:
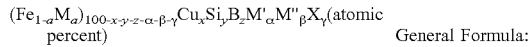
$(Fe_{1-a}M_a)_{100-x-y-z-\alpha-\beta-\gamma}Cu_xSi_yB_zM'_\alpha M''_\beta X_\gamma$ (atomic percent)

In the above general formula, M is Co and/or Ni, M' is at least one element selected from the group consisting of Nb, Mo, Ta, Ti, Zr, Hf, V, Cr, Mn, and W, M" is at least one element selected from the group consisting of Al, a platinum group element, Sc, a rare earth element, Zn, Sn, and Re, X is at least one element selected from the group consisting of C, Ge, P, Ga, Sb, In, Be, and As, and a, x, y, z, $\alpha$, $\beta$, and $\gamma$ satisfy $0 \leq a \leq 0.5$, $0.1 \leq x \leq 3$, $0 \leq y \leq 30$, $0 \leq z \leq 25$, $5 \leq y+z \leq 30$, $0 \leq \alpha \leq 20$, $0 \leq \beta \leq 20$, and $0 \leq \gamma \leq 20$, respectively.

Preferably, in the general formula, a, x, y, z, $\alpha$, $\beta$, and $\gamma$ satisfy $0 \leq a \leq 0.1$, $0.7 \leq x \leq 1.3$, $12 \leq y \leq 17$, $5 \leq z \leq 10$, $1.5 \leq \alpha \leq 5$, $0 \leq \beta \leq 1$, and $0 \leq \gamma \leq 1$, respectively.

In the present embodiment, a description will be given by applying the present disclosure to an example in which the magnetic strip 20 is a strip (FT-3 manufactured by Hitachi Metals, Ltd. (now, Proterial, Ltd.)) of a Fe—Cu—Nb—Si—B based nanocrystal alloy. Note that the magnetic strip 20 may be a nanocrystalline alloy strip having another composition represented by the above general formula or may be an amorphous alloy strip.

When the magnetic strip 20 is a nanocrystalline alloy strip, the magnetic strip 20 is mechanically more brittle than when the magnetic strip is an amorphous alloy strip. When the magnetic strip 20 is a nanocrystalline alloy strip, the cracks 21 can be formed with a small external force at the time of directly applying an external force to the magnetic strip 20 to form the cracks 21.

When the magnetic strip 20 is a nanocrystalline alloy strip, the cracks 21 can be formed without substantially forming unevenness on the surface of the magnetic strip 20. Thus, a planar state of the magnetic strip 20 can be made favorable. Thus, a temporal change of the shape of the magnetic strip 20 generated after the magnetic strip 20 and the adhesive layer 10 are bonded to each other to form the laminate substrate 300 is reduced. Also, it is possible to reduce a temporal change of the magnetic characteristics in the laminate substrate 300 and the magnetic strip 20.

As the magnetic strip 20, for example, it is possible to use an alloy strip, which is manufactured by roll rapid cooling and which has a thickness of 100 µm or less. The thickness of the magnetic strip 20 is preferably 50 µm or less, more preferably 30 µm or less, particularly preferably 25 µm or less, particularly preferably 20 µm or less. It is difficult to handle the magnetic strip 20 when the thickness is thin, and hence the thickness of the magnetic strip 20 is preferably 5 µm or more, and more preferably 10 µm or more.

The magnetic strip 20 is bonded to the adhesive 12 of the adhesive layer 10. In the present embodiment, the magnetic strip 20 is bonded to the adhesive 12 provided on the first surface 11A of the adhesive layer 10. The magnetic strip 20 and the adhesive layer 10 preferably have shapes that satisfy a relationship of a following formula.

$0.2 \text{ mm} \leq (\text{width } A - \text{width } B) \leq 3 \text{ mm}$

The width A is a dimension related to the adhesive layer 10, and more preferably a dimension related to a region provided with the adhesive 12 to which the magnetic strip 20 is bonded in the adhesive layer 10. The width B is a dimension related to the magnetic strip 20. When the adhesive 12 is provided on the entire surface of the support 11 of the adhesive layer 10, the width A is a dimension related to the adhesive layer 10 or the support 11.

Here, a lower limit of (width A–width B) is preferably 0.5 mm, and more preferably 1.0 mm. An upper limit of (width A–width B) is preferably 2.5 mm and more preferably 2.0 mm.

The magnetic strip 20 and the adhesive layer 10 are preferably disposed to satisfy a relationship of another following formula.

$0 \text{ mm} < \text{gap } a$, and $0 \text{ mm} < \text{gap } b$

The gap a and the gap b are distances from ends of the adhesive layer 10 to ends of the magnetic strip 20. Specifically, the gap a is a distance from a first adhesive layer end 10X of the adhesive layer 10 to a first strip end 20X of the magnetic strip 20. The gap b is a distance from a second adhesive layer end 10Y of the adhesive layer 10 to a second strip end 20Y of the magnetic strip 20.

The first strip end 20X is an end of the magnetic strip 20 on the same side as the first adhesive layer end 10X. The second adhesive layer end 10Y is an end of the adhesive layer 10 opposite to the first adhesive layer end 10X. The second strip end 20Y is an end of the magnetic strip 20 on the same side as the second adhesive layer end 10Y.

The width A, the width B, the gap a, and the gap b are dimensions in a direction intersecting, or more preferably orthogonal to, the longitudinal direction of the laminate substrate 300. The longitudinal direction of the laminate substrate 300 coincides with the longitudinal direction of the adhesive layer 10. The longitudinal direction of the laminate substrate 300 coincides with the longitudinal direction of the magnetic strip 20.

In the present embodiment, a method for manufacturing a multilayer magnetic sheet will be described by applying the present disclosure to an example in which the length of the magnetic strip 20 in the longitudinal direction is 20,000 m. A description will be given by applying the present disclosure to an example in which the width A, which is a dimension related to the adhesive layer 10 or the support 11, is 32 mm, the width B, which is a dimension related to the magnetic strip 20, is 30 mm, and the width A–the width B is 2 mm.

The resin sheet 15 is a film-like member formed using a resin and is also referred to as a protective film, a release film, or a liner. The resin sheet 15 is a member used for protecting the magnetic strip 20 and the multilayer magnetic sheet 400.

The resin sheet 15 has a function of preventing an unnecessary increase in the cracks 21 to be described later (or cracks connecting a plurality of cracks 21 in a mesh shape) due to application of an unintended external force to the magnetic strip 20. Further, the resin sheet 15 has a function of preventing the small pieces 22 of the magnetic strip 20 from falling off and a function of preventing the magnetic strip 20 from rusting.

Moreover, the resin sheet 15 has a function of preventing unnecessary deformation when the multilayer magnetic sheet 400 is processed into a predetermined shape. Examples of the unnecessary deformation include surface unevenness. The resin sheet 15 may be stacked together with the adhesive layer 10 as described above or may be stacked alone.

The resin sheet 15 is preferably a film-like member formed using a resin, and more preferably a member formed using a resin with elasticity. When the resin sheet 15 is a member formed using a resin, generation of unevenness on the surface of the magnetic strip 20 can be easily prevented by an elastic force of the resin sheet 15.

Even when unevenness is generated on the surface of the magnetic strip 20, the unevenness of the magnetic strip 20 tends to be flat due to the elastic force of the resin sheet 15. Thus, a planar state of the magnetic strip 20 can be made a favorable state with less unevenness. Also, a temporal change of the magnetic characteristics in the multilayer magnetic sheet 400 can be easily reduced.

As the resin sheet 15, a resin having a lower limit of a tensile elastic modulus of 0.1 GPa can be used. When the tensile elastic modulus of the resin is 0.1 GPa or more, the above effect can be easily obtained sufficiently. The lower limit of the tensile elastic modulus is preferably 0.5 GPa, and more preferably 1.0 GPa.

An upper limit of the tensile elastic modulus of the resin is preferably 10 GPa. When the upper limit exceeds 10 GPa, the deformation of the alloy strip may be suppressed when the cracks 21 to be described later are formed. The upper limit of the tensile elastic modulus is preferably 9 GPa, and more preferably 8 GPa.

In the resin sheet 15, a thickness of the resin sheet 15 is preferably 1 μm or more and 100 μm or less. When the thickness of the resin sheet 15 increases, the multilayer magnetic sheet 400 is less likely to be deformed. As a result, it may be difficult to dispose the multilayer magnetic sheet 400 along a curved surface or a bent surface.

When the thickness of the resin sheet 15 is less than 1 μm, the resin sheet 15 is more likely to be deformed. As a result, handling of the resin sheet 15 becomes difficult, and the function of supporting the magnetic strip 20 by the resin sheet 15 may not be obtained sufficiently. Moreover, when the resin sheet 15 is a protective film, a strength of the resin sheet 15 becomes weak, and the function of protecting the magnetic strip 20 and the like may not be sufficient.

As the resin of the resin sheet 15, it is possible to use, for example, polyethylene terephthalate (PET), polyimide, polyetherimide, polyethylene naphthalate, polypropylene, polyethylene, polystyrene, polycarbonate, polysulfone, polyetherketone, polyvinyl chloride, polyvinyl alcohol, a fluororesin, an acrylic resin, cellulose, or the like. Polyamide and polyimide are particularly preferable as the resin for forming the resin sheet 15 from the viewpoint of a heat resistance and a dielectric loss.

Next, a method for manufacturing the multilayer magnetic sheet 400 of the present embodiment will be described with reference to FIGS. 6 to 12. First, a method for manufacturing a magnetic sheet 100 constituting the multilayer magnetic sheet 400 and the laminate substrate 300 will be described.

Figure 6:
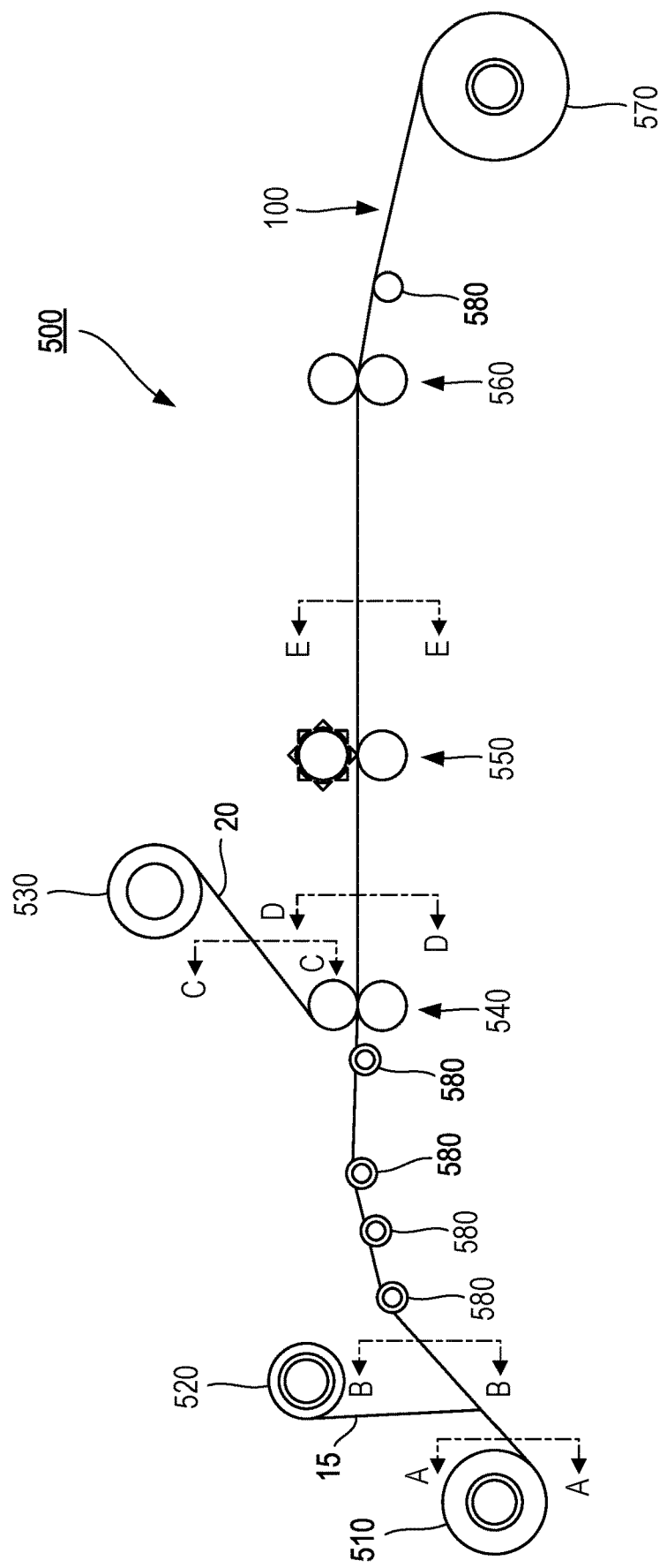
FIG. 6 is a schematic view for explaining a method for manufacturing a magnetic sheet.

FIG. 6 is a schematic view for explaining a method for manufacturing the magnetic sheet 100.

The magnetic sheet 100 is a magnetic sheet constituting the laminate substrate 300 and the multilayer magnetic sheet 400. The magnetic sheet 100 is manufactured using a manufacturing apparatus 500 illustrated in FIG. 6. The manufacturing apparatus 500 has a first unwinding roll 510, a first winding roll 520, a second unwinding roll 530, attaching rolls 540, crack rolls 550, flattening rolls 560, and a third winding roll 570 as main components from an upstream side to a downstream side in the manufacturing process. The manufacturing apparatus 500 may further comprise a plurality of guide rolls 580. Note that the guide roll 580 can be disposed as necessary even at a position not illustrated.

Figure 7:
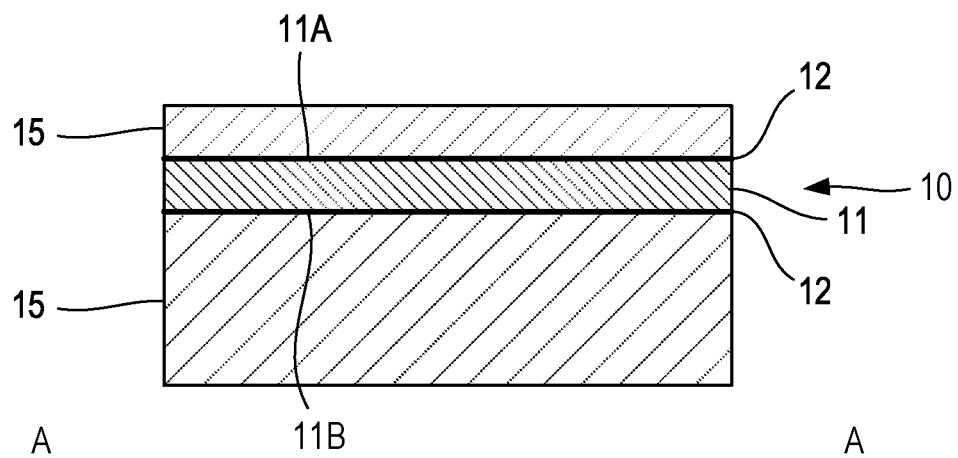
FIG. 7 is a cross-sectional view for explaining a configuration of a laminate supplied from a first unwinding roll.

FIG. 7 is a cross-sectional view for explaining a configuration of a laminate supplied from the first unwinding roll 510.

As illustrated in FIG. 7, a laminate in which the resin sheet 15 is stacked on each of the first surface 11A and the second surface 11B of the adhesive layer 10 is wound around the first unwinding roll 510. The resin sheet 15 disposed on the first surface 11A is a protective sheet, and the resin sheet 15 disposed on the second surface 11B is also referred to as a "liner". The resin sheet 15 disposed on the first surface 11A is a sheet thinner than the resin sheet 15 disposed on the second surface 11B.

Figure 8:
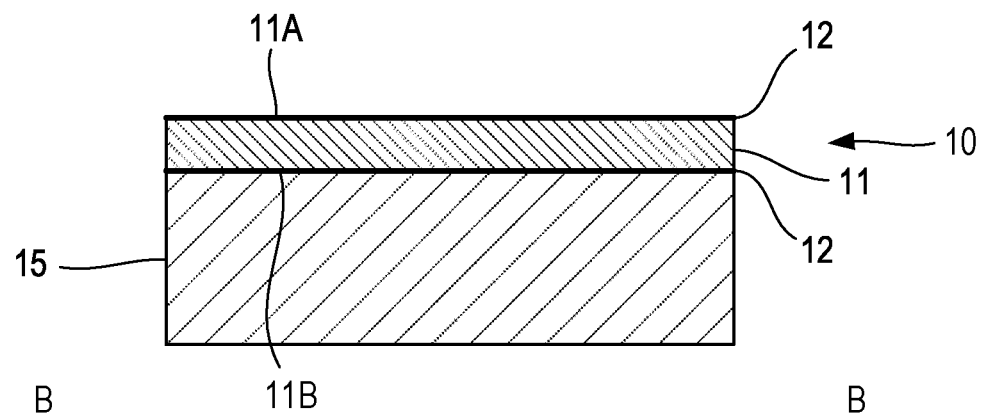
FIG. 8 is a cross-sectional view for explaining a configuration of a laminate supplied from a first unwinding roll, with a resin sheet peeled off.

FIG. 8 is a cross-sectional view for explaining a configuration of the laminate, which is supplied from the first unwinding roll 510 and from which the resin sheet 15 has been peeled off.

As illustrated in FIG. 8, the resin sheet 15 disposed on the first surface 11A is peeled off from the laminate unwound from the first unwinding roll 510. As illustrated in FIG. 6, the peeled resin sheet 15 is wound around the first winding roll 520.

Figure 9:
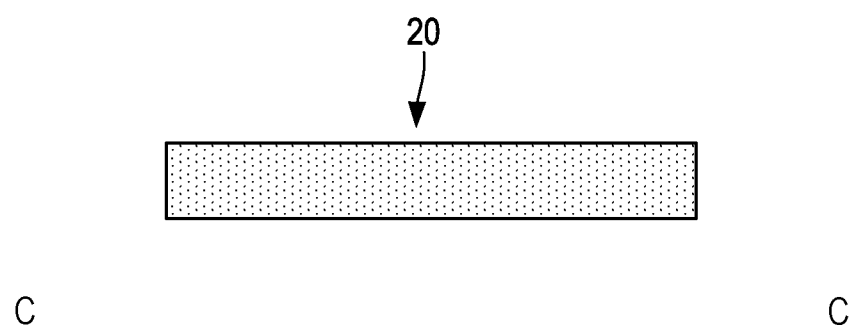
FIG. 9 is a cross-sectional view for explaining a configuration of a magnetic strip supplied from a second unwinding roll.

FIG. 9 is a cross-sectional view for explaining a configuration of the magnetic strip 20 supplied from the second unwinding roll 530.

The laminate, from which the resin sheet 15 disposed on the first surface 11A has been peeled off, is guided to the attaching rolls 540 by the plurality of guide rolls 580. The magnetic strip 20 unwound from the second unwinding roll 530 has further been guided to the attaching rolls 540. As illustrated in FIG. 9, there is no crack 21 formed in the magnetic strip 20 guided to the attaching rolls 540.

Here, a method for manufacturing the magnetic strip 20 unwound from the second unwinding roll 530 will be described. For example, a case where the magnetic strip 20 is a nanocrystalline alloy will be described. The magnetic strip 20 is manufactured by a manufacturing method comprising: a step of rapidly cooling a molten alloy to obtain an amorphous alloy strip capable of nanocrystallization; and a heat treatment step of heat-treating the amorphous alloy strip at a temperature equal to or higher than a crystallization onset temperature to form fine crystal grains.

The rapid cooling described above is performed by a single roll method in which a molten metal is discharged onto a rotating cooling roll and rapidly cooled and solidified. The magnetic strip 20 has an elongated shape in which a direction along a rotation direction of the cooling roll is a longitudinal direction. The length of the magnetic strip 20 in the longitudinal direction may be, for example, 20,000 m.

Temperature of the heat treatment varies depending on the alloy composition, but is generally 450° C. or higher. The fine crystal grains are, for example, Fe having a body-centered cubic lattice structure with solid solution of Si or the like. Analysis of the fine crystal grains can be performed using X-ray diffraction and a transmission electron microscope.

In the nanocrystalline alloy, at least 50 vol % of the nanocrystalline alloy is occupied by fine crystal grains having an average grain size of 100 nm or less, measured in the largest dimension. A portion except for the fine crystal grains in the nanocrystalline alloy is mainly amorphous. The proportion of the fine crystal grains may be substantially 100 vol %.

Figure 10:
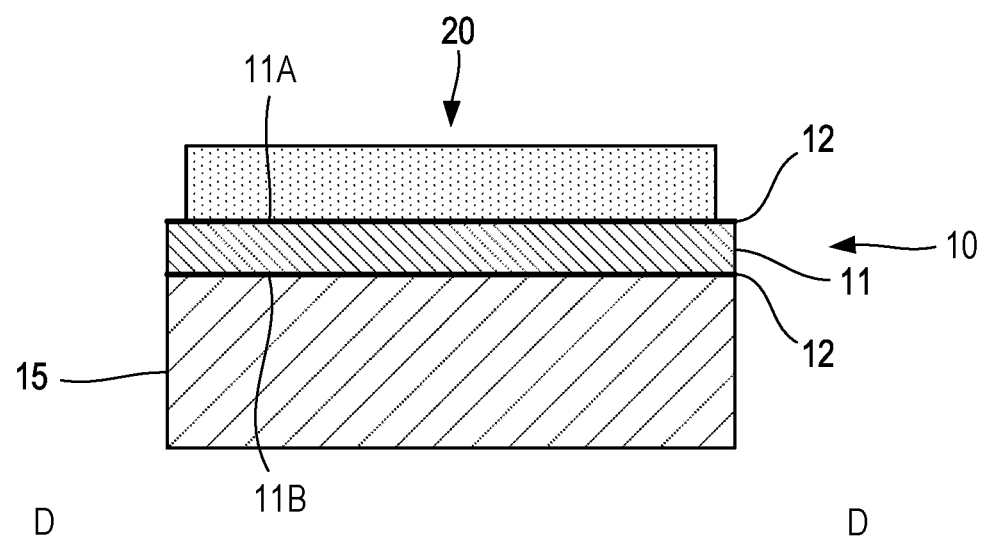
FIG. 10 is a cross-sectional view for explaining a state in which the magnetic strip has been bonded to an adhesive layer by attaching rolls.

FIG. 10 is a cross-sectional view for explaining a state in which the magnetic strip 20 has been bonded to the adhesive layer 10 by the attaching rolls 540.

As illustrated in FIG. 6, the attaching rolls 540 press and bond the magnetic strip 20 to the laminate from which the resin sheet 15 has been peeled off. Specifically, the laminate and the magnetic strip 20 are guided between two rolls disposed to face each other, and the magnetic strip 20 is pressed against and bonded to the first surface 11A of the adhesive layer 10 using the two rolls as illustrated in FIG. 10.

The magnetic strip 20 may be disposed such that its center coincides with the center of the adhesive layer 10 in the width direction, or may be disposed such that its center is away from the center of the adhesive layer 10. In this case, the placement is made to satisfy the relationship of 0 mm<gap a, and 0 mm<gap b (cf. FIG. 5). As illustrated in FIG. 6, the laminate to which the magnetic strip 20 is bonded is guided from the attaching rolls 540 to the crack rolls 550.

Figure 11:
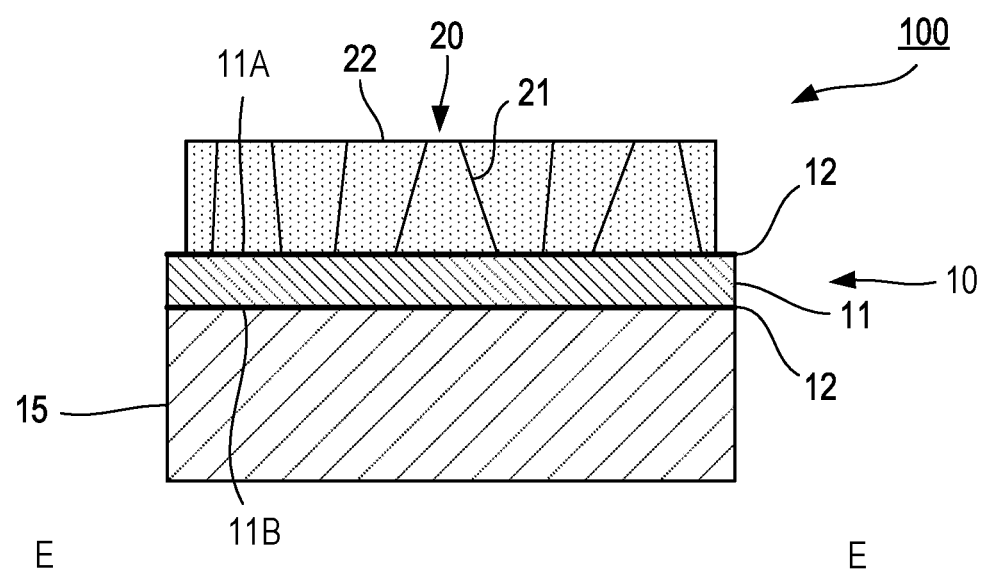
FIG. 11 is a cross-sectional view for explaining a state in which cracks have been formed in a magnetic strip by crack rolls.

FIG. 11 is a cross-sectional view for explaining a state in which the cracks 21 have been formed in the magnetic strip 20 by the crack rolls 550.

The crack rolls 550 form the cracks 21 in the magnetic strip 20 bonded to the adhesive layer 10. Specifically, a laminate to which the magnetic strip 20 is bonded is guided between two rolls disposed to face each other, and a roll provided with protrusions among the two rolls is pressed against the magnetic strip 20 to form the cracks 21 as illustrated in FIG. 11.

Among the two rolls, the roll provided with no protrusion is disposed on a side of the laminate from which the resin sheet 15 has been peeled off. The magnetic strip 20 in which the cracks 21 are formed comprises a plurality of small pieces 22. The plurality of small pieces 22 are bonded to the adhesive layer 10.

Here, a configuration of the crack rolls 550 will be described. The crack rolls 550 comprise a roll having a plurality of convex members arranged on a peripheral surface. A tip of an end of the convex member of the crack rolls 550 may be flat, conical, inverted conical with a recessed center, or cylindrical. The plurality of convex members may be arranged regularly or irregularly.

The long magnetic strip 20 is pressed against the crack rolls 550 or the long magnetic strip 20 is caused to pass between the two crack rolls 550 to continuously form the cracks 21 in the magnetic strip 20. Further, the convex members of the crack rolls 550 are pressed against a plurality of places on the surface of the magnetic strip 20 to form a plurality of cracks 21 in the magnetic strip 20.

In the formation of the cracks using the crack rolls 550, it is preferable to further form cracks connecting the plurality of cracks 21 in a mesh shape. Specifically, it is preferable to include a step of pressing the crack rolls 550 against the magnetic strip 20 to form a plurality of cracks 21 and then forming cracks connecting the plurality of cracks 21 in a mesh shape.

For example, after an external force is directly applied to the magnetic strip 20 by using the crack rolls 550 to form the cracks 21, a second external force may be applied by means such as bending or winding the magnetic strip 20 to form cracks connecting the plurality of cracks 21 in a mesh shape. Cracks connecting the cracks 21 (magnetic gaps connecting the cracks) are formed by using the cracks 21 as starting points of brittle fracture and/or crack fracture.

In the step of forming cracks connecting the plurality of cracks 21 in a mesh shape, the second external force as described above may not be applied. When the second external force is not applied, cracks connecting the plurality of cracks 21 in a mesh shape are formed in the process of forming the plurality of cracks 21.

The laminate guided from the crack rolls 550 to the flattening rolls 560 is subjected to a flattening treatment by the flattening rolls 560. Note that the flattening rolls 560 are also referred to as shaping rolls.

Specifically, the laminate is guided between two rolls disposed opposite to each other in the flattening rolls 560, and the laminate is sandwiched and pressed by the two rolls. As a result, the surface of the magnetic strip 20 in which the cracks 21 are formed is flattened.

The laminate subjected to the flattening treatment becomes the magnetic sheet 100. The magnetic sheet 100 is guided to the third winding roll 570 via the guide roll 580. The magnetic sheet 100 is wound around the third winding roll 570.

FIG. 12 is a schematic view for explaining a method for manufacturing the laminate substrate 300.

The laminate substrate 300 is manufactured using a manufacturing apparatus 600 illustrated in FIG. 12. FIG. 12 illustrates the manufacturing apparatus 600 for manufacturing the laminate substrate 300 comprising five layers of magnetic strips 20.

The manufacturing apparatus 600 comprises a supply roll 601, a resin sheet winding roll 602, a first magnetic sheet unwinding roll 611, a first winding roll 612, first attaching rolls 613, a second magnetic sheet unwinding roll 621, a second winding roll 622, second attaching rolls 623, a third magnetic sheet unwinding roll 631, a third winding roll 632, third attaching rolls 633, a fourth magnetic sheet unwinding roll 641, a fourth winding roll 642, fourth attaching rolls 643, a fifth magnetic sheet unwinding roll 651, fifth attaching rolls 653, flattening rolls 663, and a laminate substrate winding roll 670 as main components from an upstream side to a downstream side in the manufacturing process. The manufacturing apparatus 600 may further comprise a plurality of guide rolls 680. Note that the guide roll 680 can be disposed as necessary even at a position not described.

Note that the manufacturing apparatus 600 may manufacture the laminate substrate 300 in which the number of the magnetic strips 20 is two or more and 20 or less. Further, the laminate substrate 300 in which the number of the magnetic strips 20 is 20 or more may be manufactured. In this case, the number of the above-described first magnetic sheet unwinding roll 611 and the like is changed in accordance with the number of the magnetic strips 20. The number of the layers of the magnetic strips 20 may be determined as appropriate. However, in the case of winding the laminate substrate 300, when the number of the layers of the magnetic strips 20 is large, the winding may be difficult, or a shape defect may occur at the time of winding. Hence the number of the layers is preferably 15 or less in the case of winding the laminate substrate 300. The number of the layers is more preferably 10 or less. In addition, the number of the layers of the magnetic strips 20 is preferably three or more, more preferably four or more, and still more preferably five or more. Although it is also possible to produce the laminate substrate 300 having more than 20 layers, the number of the layers is preferably 20 or less because the apparatus becomes excessively large.

A laminate in which the resin sheet 15 is stacked on each of the first surface 11A and the second surface 11B of the adhesive layer 10 as illustrated in FIG. 7 is wound around the supply roll 601.

From the laminate unwound from the supply roll 601, the resin sheet 15 disposed on the first surface 11A is peeled off as illustrated in FIG. 8. As illustrated in FIG. 12, the peeled resin sheet 15 is wound around the resin sheet winding roll 602.

The laminate from which the resin sheet 15 disposed on the first surface 11A has been peeled off is guided to the first attaching rolls 613 by the guide roll 680. The magnetic sheet 100 unwound from the first magnetic sheet unwinding roll 611 is further guided to the first attaching rolls 613.

The first attaching rolls 613 press and bond the magnetic sheet 100 to the laminate from which the resin sheet 15 has been peeled off. Specifically, the laminate and the magnetic sheet 100 are guided between the two rolls disposed to face each other, and the magnetic strip 20 of the magnetic sheet 100 is pressed against and bonded to the first surface 11A of the adhesive layer 10 using the two rolls.

The magnetic strip 20 of the magnetic sheet 100 to be bonded may be disposed such that its center coincides with the center of the adhesive layer 10 in the width direction, or may be disposed such that its center is away from the center of the adhesive layer 10. In this case, the placement is made to satisfy the relationship of 0 mm<gap a, and 0 mm<gap b (cf. FIG. 5).

The resin sheet 15 of the magnetic sheet 100 bonded by the first attaching rolls 613 is peeled off from the magnetic sheet 100 and wound around the first winding roll 612. The laminate after the resin sheet 15 is wound around the first winding roll 612 is guided to the second attaching rolls 623. The magnetic sheet 100 unwound from the second magnetic sheet unwinding roll 621 is further guided to the second attaching rolls 623.

The second attaching rolls 623 press and bond the magnetic sheet 100 to the laminate guided from the first attaching rolls 613. The magnetic strip 20 of the magnetic sheet 100 to be bonded may be disposed such that its center coincides with the center of the adhesive layer 10 of the laminate guided from the first attaching rolls 613 in the width direction, or may be disposed such that its center is away from the center of the adhesive layer 10.

In this case, the placement is made to satisfy the relationship of 0 mm<gap a, and 0 mm<gap b (cf. FIG. 5). The resin sheet 15 of the magnetic sheet 100 bonded by the second attaching rolls 623 is peeled off from the magnetic sheet 100 and wound around the second winding roll 622.

The laminate after the resin sheet 15 is wound around the second winding roll 622 is guided to the third attaching rolls 633. The magnetic sheet 100 unwound from the third magnetic sheet unwinding roll 631 is further guided to the third attaching rolls 633.

The third attaching rolls 633 press and bond the magnetic sheet 100 to the laminate guided from the second attaching rolls 623. The magnetic strip 20 of the magnetic sheet 100 to be bonded may be disposed such that its center coincides with the adhesive layer 10 of the laminate guided from the second attaching rolls 623 in the width direction, or may be disposed such that its center is away from the center of the adhesive layer 10.

In this case, the placement is made to satisfy the relationship of 0 mm<gap a, and 0 mm<gap b (cf. FIG. 5). The resin sheet 15 of the magnetic sheet 100 bonded by the third attaching rolls 633 is peeled off from the magnetic sheet 100 and wound around the third winding roll 632.

The laminate after the resin sheet 15 is wound around the third winding roll 632 is guided to the fourth attaching rolls 643. The magnetic sheet 100 unwound from the fourth magnetic sheet unwinding roll 641 is further guided to the fourth attaching rolls 643.

The fourth attaching rolls 643 presses and bond the magnetic sheet 100 to the laminate guided from the third attaching rolls 633. The magnetic strip 20 of the magnetic sheet 100 to be bonded may be disposed such that its center coincides with the adhesive layer 10 of the laminate guided from the third attaching rolls 633 in the width direction, or may be disposed such that its center is away from the center of the adhesive layer 10.

In this case, the placement is made to satisfy the relationship of 0 mm<gap a, and 0 mm<gap b (cf. FIG. 5). The resin sheet 15 of the magnetic sheet 100 bonded by the fourth attaching rolls 643 is peeled off from the magnetic sheet 100 and wound around the fourth winding roll 642.

The laminate after the resin sheet 15 is wound around the fourth winding roll 642 is guided to the fifth attaching rolls 653. The magnetic sheet 100 unwound from the fifth magnetic sheet unwinding roll 651 is further guided to the fifth attaching rolls 653.

The fifth attaching rolls 653 press and bond the magnetic sheet 100 to the laminate guided from the fourth attaching rolls 643. The magnetic strip 20 of the magnetic sheet 100 to be bonded may be disposed such that its center coincides with the adhesive layer 10 of the laminate guided from the fourth attaching rolls 643 in the width direction, or may be disposed such that its center is away from the center of the adhesive layer 10.

In this case, the placement is made to satisfy the relationship of 0 mm<gap a, and 0 mm<gap b (cf. FIG. 5). The laminate guided from the fifth attaching rolls 653 to the flattening rolls 663 is subjected to the flattening treatment by the flattening rolls 663.

It is preferable that the magnetic strip 20 and the adhesive layer 10 are disposed to satisfy the relationship of 0 mm<gap a, and 0 mm<gap b (cf. FIG. 5) as described above. However, in the stacking step of the magnetic sheet 100 and the laminate, misalignment of the positional relationship may occur. When the misalignment of the positional relationship occurs, for example, the gap a may become negative in the relationship between the magnetic strip 20 and the adhesive layer 10. That is, on the one surface side of the magnetic strip 20, the end of the magnetic strip 20 may protrude from the end of the adhesive layer 10. Even if the end of the magnetic strip 20 protrudes from the end of the adhesive layer 10 on the one surface side of the magnetic strip 20, the magnetic strip 20 can maintain the state of being bonded to the adhesive layer 10 as long as the magnetic strip 20 and the adhesive layer 10 are disposed on the other surface side of the magnetic strip 20 to satisfy the relationship of 0 mm<gap a, and 0 mm<gap b (cf. FIG. 5).

FIG. 3 is a cross-sectional view for explaining a configuration of the laminate substrate 300. The laminate after being subjected to the flattening treatment becomes the laminate substrate 300 illustrated in FIG. 3. The laminate substrate 300 is guided to the laminate substrate winding roll 670 via the guide roll 680. The laminate substrate 300 is wound around the laminate substrate winding roll 670.

Note that the laminate substrate 300 may be continuously cut to a required length in addition to the method in which the laminate substrate 300 is wound around the laminate substrate winding roll 670.

As illustrated in FIG. 1, the laminate substrate 300 manufactured by the manufacturing apparatus 600 is cut so that the dimension in the direction in which the long side 300L extends becomes the length L. The cut laminate substrates 300 are aligned and arranged in a plate shape in the direction in which the short side 300S extends and are overlapped with each other at the long side 300L portions. For example, the laminate substrates 300 are stacked in the thickness direction as illustrated in FIG. 2. The multilayer magnetic sheet 400 can be configured using the laminate substrates 300 disposed in this manner.

The multilayer magnetic sheet 400 of the present disclosure from the lower end to the upper end in the stacking direction of the magnetic strip 20 may be configured with the structure illustrated in FIG. 2.

In the multilayer magnetic sheet 400 of the present disclosure, at least a part in the stacking direction of the magnetic strip 20 may be configured using the laminate substrate 300, and a portion not configured using the laminate substrate 300 may be configured using the magnetic strip 20. Note that being configured using the magnetic strip 20 means being configured by arranging the magnetic strips 20 in a single layer or stacking the magnetic strips 20.

In the multilayer magnetic sheet 400 of the present disclosure, a portion where the long side portions of the laminate substrates 300 overlap each other may be at least a part in the stacking direction of the magnetic strips 20. In this case, a portion where the long side portions of the laminate substrates 300 do not overlap each other may be configured by arranging the laminate substrates 300 such that the long side portions do not overlap each other, may be configured by stacking the laminate substrates 300, or may be configured by arranging the magnetic strips 20 in a single layer or stacking the magnetic strips 20.

In the multilayer magnetic sheet 400 of the present disclosure, ten layers or more of the magnetic strips 20 are preferably stacked in total. The number of the layers is more preferably 15 or more, further preferably 20 or more, and more preferably 25 or more. The total of the layers of the stacked magnetic strips 20 is preferably 200 or less. The total of the layers is preferably 150 or less. The total of the layers may be 100 or less.

Example 1

Figure 13:
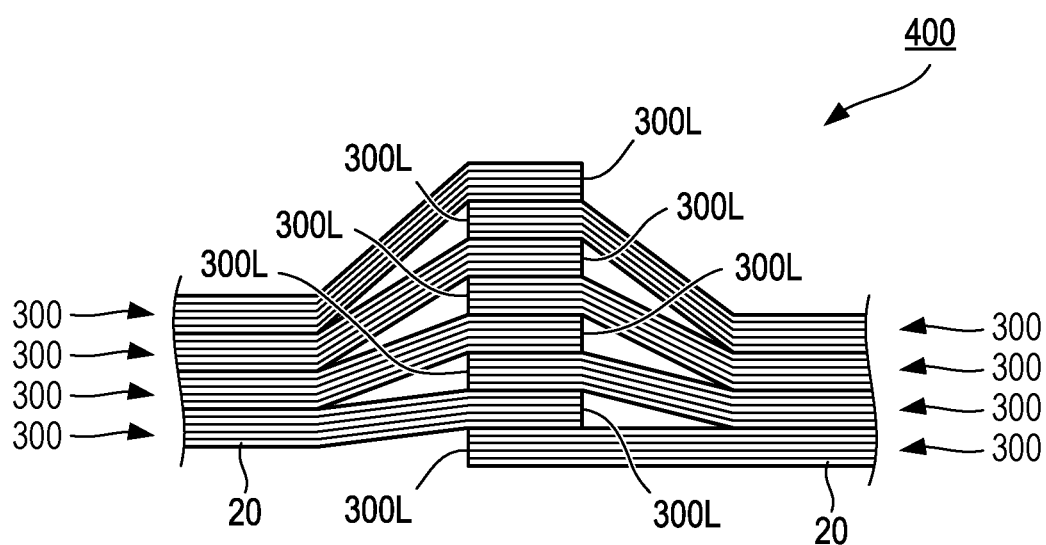
FIG. 13 is a cross-sectional view for explaining a configuration of a multilayer magnetic sheet of Example 1.

A magnetic strip 20, which is a strip (FT-3 manufactured by Hitachi Metals, Ltd. (now, Proterial, Ltd.)) being a Fe—Cu—Nb—Si—B based nanocrystal alloy with a width of 30 mm, is used. As illustrated in FIG. 3, five layers of the magnetic strips 20 are stacked through the adhesive layers 10 (width: 32 mm), and eight laminate substrates 300 each having a width of 32 mm and a length of 100 mm are produced. A multilayer magnetic sheet 400 of Example 1 having a structure illustrated in FIG. 13 was prepared using the eight laminate substrates 300.

Specifically, two laminate substrates 300 are overlapped with each other at the long side portions by about 4 mm. Four layers of the overlapped laminate substrates 300 were stacked in the thickness direction to produce a multilayer magnetic sheet 400, which is Example 1.

Example 2

Figure 14:
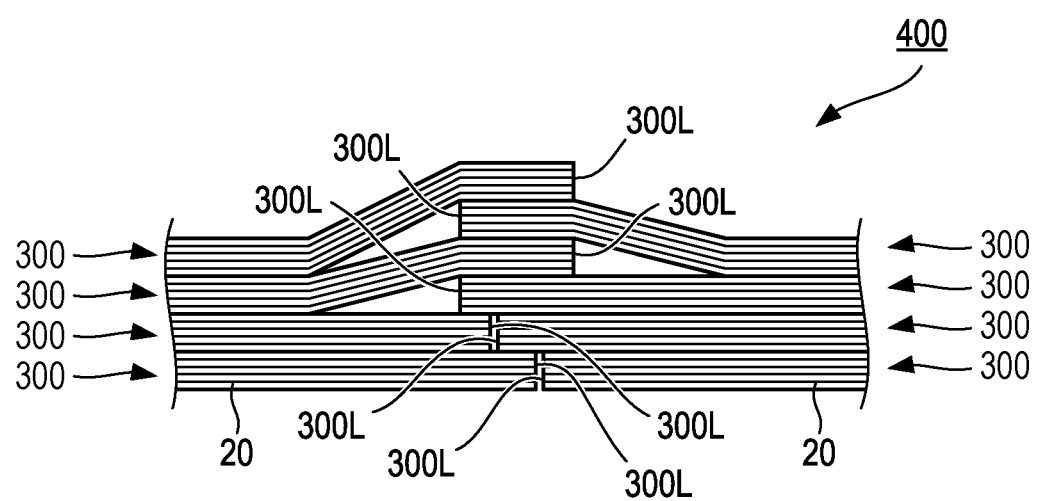
FIG. 14 is a cross-sectional view for explaining a configuration of a multilayer magnetic sheet of Example 2.

A magnetic strip 20, which is a strip (FT-3 manufactured by Hitachi Metals, Ltd. (now, Proterial, Ltd.)) being a Fe—Cu—Nb—Si—B based nanocrystal alloy with a width of 30 mm, is used. As illustrated in FIG. 3, five layers of the magnetic strips 20 are stacked through the adhesive layers 10 (width: 32 mm), and eight laminate substrates 300 each having a width of 32 mm and a length of 100 mm are produced. A multilayer magnetic sheet 400 of Example 2 having a structure illustrated in FIG. 14 was prepared using the eight laminate substrates 300.

Specifically, two laminate substrates 300 are disposed without being overlapped (i.e., the long sides 300L are butted against each other). Two layers of the aligned laminate substrates 300 are stacked in the thickness direction. When viewed in the thickness direction, the laminate substrates 300 in a first layer (i.e., a lower layer in FIG. 14) and the laminate substrates 300 in a second layer (i.e., an upper layer in FIG. 14) are disposed with the positions of the long sides 300L thereof shifted from each other. Note that the amount of shift was set to 4 mm. On the stacked laminate substrates 300, two layers of the laminate substrates 300 with the long side portions overlapped by about 4 mm were stacked in the thickness direction to produce a multilayer magnetic sheet 400, which is Example 2.

Example 3

Figure 15:
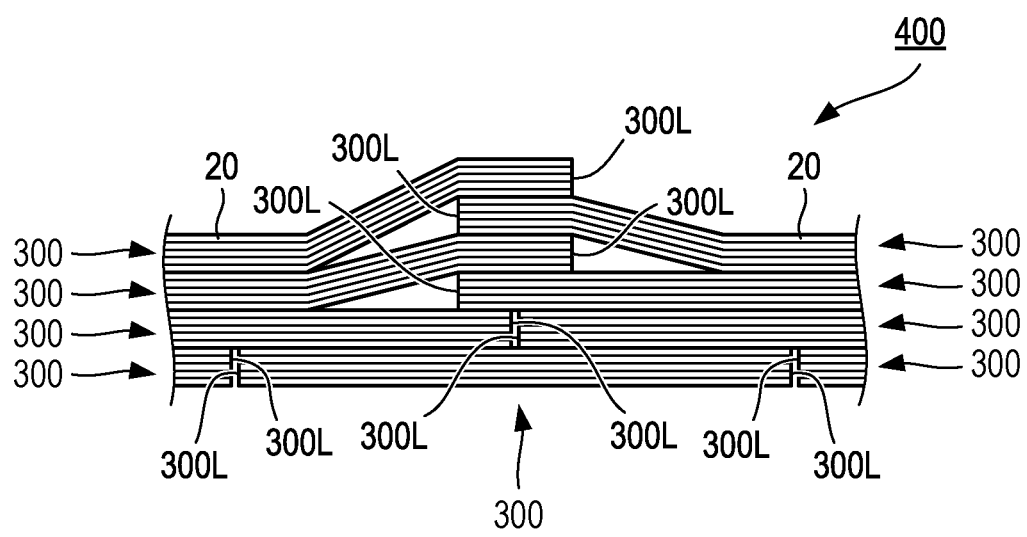
FIG. 15 is a cross-sectional view for explaining a configuration of a multilayer magnetic sheet of Example 3.

A magnetic strip 20, which is a strip (FT-3 manufactured by Hitachi Metals, Ltd. (now, Proterial, Ltd.)) being a Fe—Cu—Nb—Si—B based nanocrystal alloy with a width of 30 mm, is used. As illustrated in FIG. 3, five layers of the magnetic strips 20 are stacked through the adhesive layers 10 (width: 32 mm), and nine laminate substrates 300 each having a width of 32 mm and a length of 100 mm are produced. A multilayer magnetic sheet 400 of Example 3 having a structure illustrated in FIG. 15 was prepared using the nine laminate substrates 300.

Specifically, in a first layer (the lowermost layer in FIG. 15), three laminate substrates 300 are aligned without being overlapped (i.e., with the long sides 300L butted together). In a second layer (a second layer from the bottom in FIG. 15), two laminate substrates 300 are aligned without being overlapped (i.e., with the long sides 300L butted together). The laminate substrates 300 in the first layer and the laminate substrates 300 in the second layer are arranged with the positions of the long sides 300L thereof shifted from each other. The amount of shift was about half the width of the laminate substrate 300. On the stacked laminate substrates 300, two layers of the laminate substrates 300 with the long side portions overlapped by about 4 mm were stacked in the thickness direction to produce a multilayer magnetic sheet 400, which is Example 3.

Comparative Example

Figure 16:
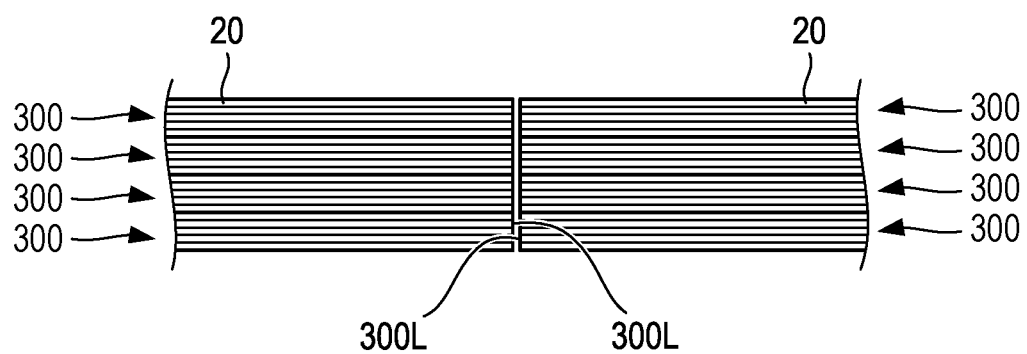
FIG. 16 is a cross-sectional view for explaining a configuration of a multilayer magnetic sheet of a comparative example.

A magnetic strip 20, which is a strip (FT-3 manufactured by Hitachi Metals, Ltd. (now, Proterial, Ltd.)) being a Fe—Cu—Nb—Si—B based nanocrystal alloy with a width of 30 mm, is used. As illustrated in FIG. 3, five layers of the magnetic strips 20 are stacked through the adhesive layers 10 (width: 32 mm), and eight laminate substrates 300 each having a width of 32 mm and a length of 100 mm are produced. A multilayer magnetic sheet of a comparative example having a structure illustrated in FIG. 16 was prepared using the eight laminate substrates 300.

Specifically, two laminate substrates 300 are disposed without being overlapped (i.e., the long sides 300L are butted against each other). Four layers of the aligned laminate substrates 300 were stacked in the thickness direction to produce a multilayer magnetic sheet, which is the comparative example.

Each of the examples and the comparative example is configured such that 20 layers of the magnetic strips 20 are stacked in the stacking direction in total. In each of the examples and the comparative example, cracks are formed in the magnetic strip 20. In each of the examples and the comparative example, μ' and Q were evaluated. Table 1 shows evaluation results of μ' and Q of each example. In each of the examples of the present disclosure, μ' is three times or more higher and Q is two times or more higher than those in the comparative example. It can be seen that the multilayer magnetic sheet 400 having excellent magnetic characteristics can be obtained according to the present disclosure.

TABLE 1

|  | µ' | Q |
|---|---|---|
| Comparative Example | 232 | 6 |
| Example 1 | 974 | 16 |
| Example 2 | 958 | 15 |
| Example 3 | 963 | 15 |

Note that methods for measuring µ' and Q are as follows. Each of the multilayer magnetic sheets 400 of the examples and the comparative example was punched into a ring shape having an outer diameter of 20 mm and an inner diameter of 9 mm to obtain a sample for evaluation. The sample for evaluation was punched out so that a boundary portion of two laminate substrates 300 aligned in the multilayer magnetic sheet 400 is approximately the diameter portion of the ring shape. Using the sample for evaluation, an impedance (Z) and an inductance ($L_S$) of a series equivalent circuit are calculated with an impedance analyzer (E4990A manufactured by Keysight Technologies, measurement jig: 16454A) at an OSC level of 0.03 V and with a frequency of 84 kHz at a temperature of 25° C., and calculated on the basis of a following equation:

$$\mu' = 2\pi \times L_S / (\mu_0 \times t \times n \times \ln(OD/ID))$$

Z: absolute value of impedance
t: strip thickness (m)
n: number of layers
$\mu_0$: vacuum magnetic permeability ($4 \times \pi \times 10^{-7}$ H/m)
OD: outer diameter (m)
ID: inner diameter (m)
Q=µ'/µ''

$$\mu'' = \sqrt{\mu r^2 - \mu'^2} \quad \text{[Mathematical formula 1]}$$

$$\mu r = 2\pi \times Z / (2\pi \times \mu_0 \times f \times t \times n \times \ln(OD/ID))$$

f: frequency (Hz)

FIGS. 17 to 20 illustrate configurations of multilayer magnetic sheets 400 of Examples 4 to 7.

Figure 17:
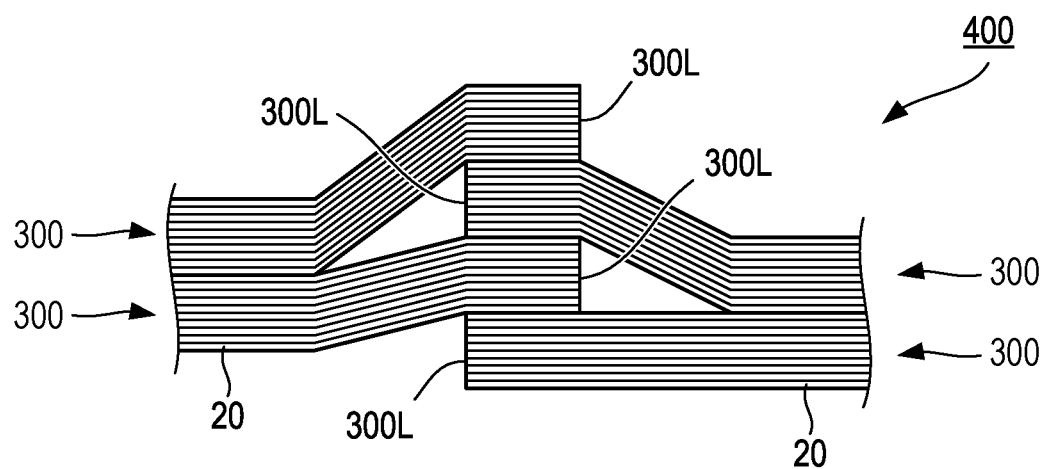
FIG. 17 is a cross-sectional view for explaining a configuration of a multilayer magnetic sheet of Example 4.

As illustrated in FIG. 17, the multilayer magnetic sheet 400 of Example 4 comprises four laminate substrates 300 each having a total of ten layers of the magnetic strips 20. The multilayer magnetic sheet 400 of Example 4 has a structure in which long side portions of two laminate substrates 300 are overlapped with each other, and two layers of the overlapped laminate substrates 300 are stacked in the thickness direction.

Figure 18:
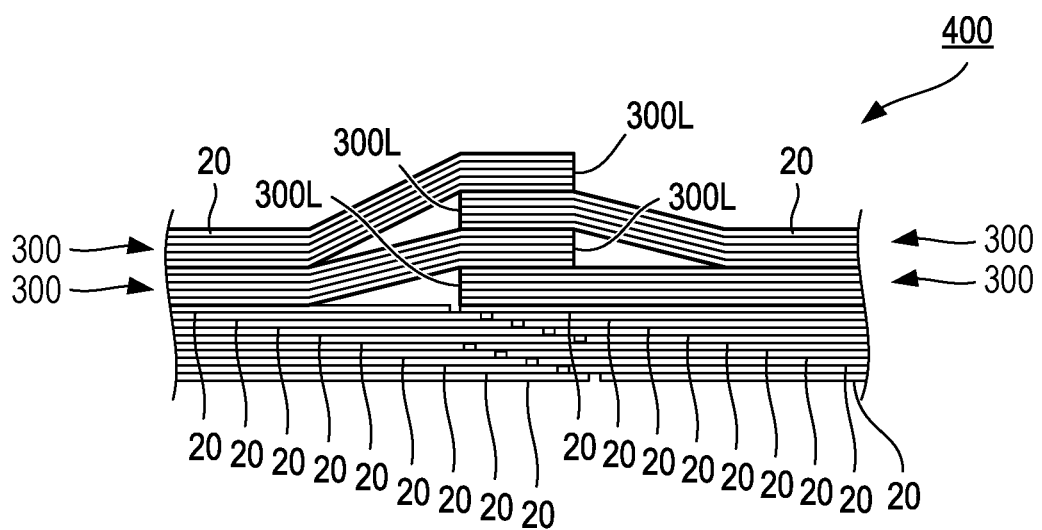
FIG. 18 is a cross-sectional view for explaining a configuration of a multilayer magnetic sheet of Example 5.

As illustrated in FIG. 18, the multilayer magnetic sheet 400 of Example 5 comprises four laminate substrates 300 each having a total of five layers of the magnetic strips 20. Further, 20 magnetic strips 20 are provided separately from the laminate substrates 300.

In each of a first layer (the lowermost layer in FIG. 18) to a tenth layer (a tenth layer from the bottom in FIG. 18), two magnetic strips 20 are aligned without being overlapped (i.e., with the long sides butted together). The magnetic strips 20 in the first layer to the tenth layer are arranged with the long sides shifted from each other. Positions of the long side portions of first to fifth layers are shifted in the same direction, and sixth to tenth layers are repeated in the same positional relationship as the first to fifth layers. Then, four laminate substrates 300 are stacked from an eleventh layer (an eleventh layer from the bottom in FIG. 18) and above.

Two laminate substrates 300 are disposed with the long side portions overlapped with each other, and two layers thereof are stacked.

Figure 19:
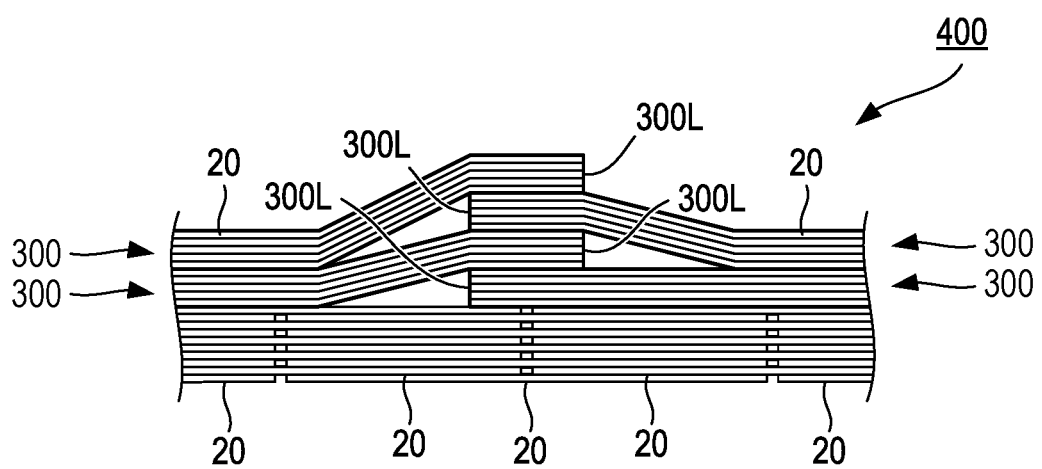
FIG. 19 is a cross-sectional view for explaining a configuration of a multilayer magnetic sheet of Example 6.

As illustrated in FIG. 19, the multilayer magnetic sheet 400 of Example 6 comprises four laminate substrates 300 each having a total of five layers of the magnetic strips 20. Further, 25 the magnetic strips 20 are provided separately from the laminate substrates 300.

In each of first, third, fifth, seventh, and ninth layers (the lowermost layer, and third, fifth, seventh, and ninth layers from the bottom in FIG. 19), three magnetic strips 20 are aligned without being overlapped (i.e., with the long sides butted together). In each of second, fourth, sixth, eighth, and tenth layers (second, fourth, sixth, eighth, and tenth layers from the bottom in FIG. 19), two magnetic strips 20 are aligned without being overlapped (i.e., with the long sides butted together). The magnetic strips 20 in the odd-numbered layers and the magnetic strips 20 in the even-numbered layers are arranged with the long sides shifted from each other. The amount of shift is about half the width of the magnetic strip 20. Four laminate substrates 300 are stacked on an eleventh layer (an eleventh layer from the bottom in FIG. 19). Two laminate substrates 300 are disposed with the long side portions overlapped with each other, and two layers thereof are stacked.

Figure 20:
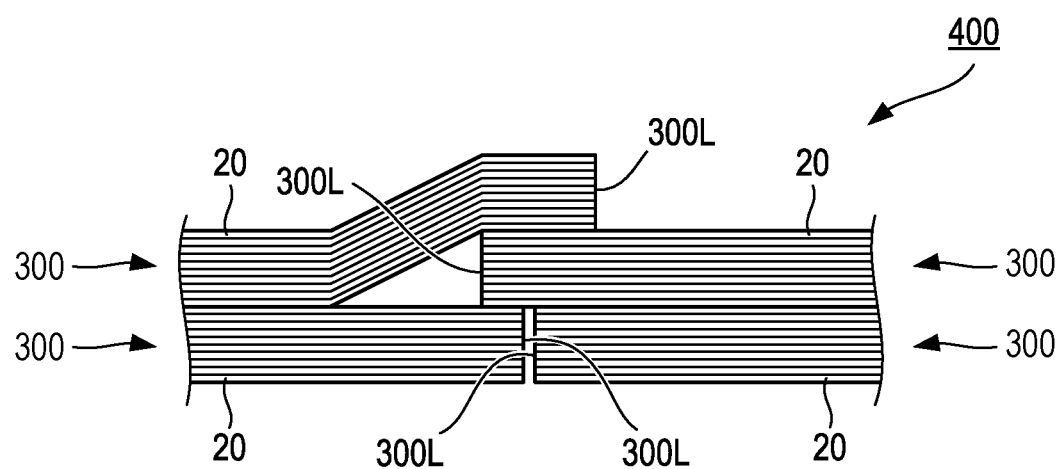
FIG. 20 is a cross-sectional view for explaining a configuration of a multilayer magnetic sheet of Example 7.

As illustrated in FIG. 20, the multilayer magnetic sheet 400 of Example 7 comprises four laminate substrates 300 each having a total of ten layers of the magnetic strips 20. In a first layer (the lowermost layer in FIG. 20), two laminate substrates 300 are aligned without being overlapped (i.e., with the long sides 300L butted together). In a second layer (a second layer from the bottom in FIG. 20), two laminate substrates 300 are disposed with the long side portions overlapped with each other.

Figure 21:
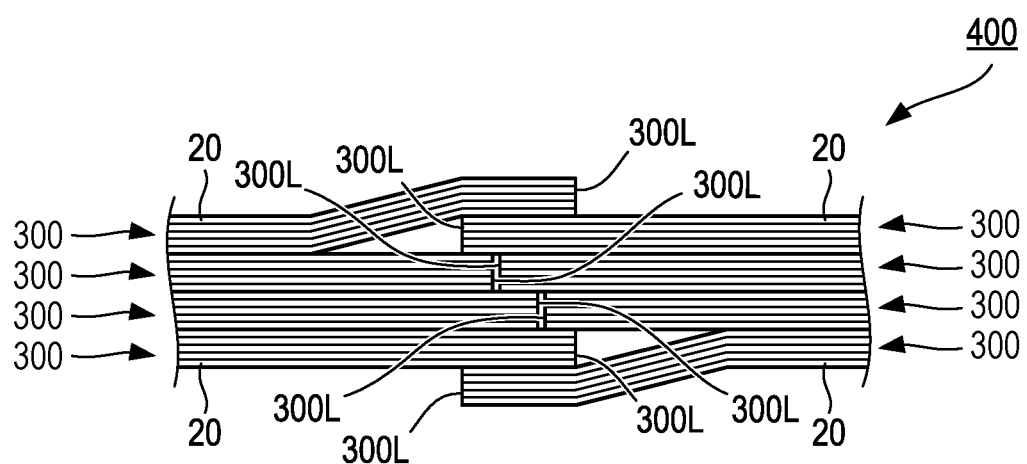
FIG. 21 is a cross-sectional view for explaining a configuration of a multilayer magnetic sheet of Example 8.

As illustrated in FIG. 21, a multilayer magnetic sheet 400 of Example 8 comprises eight laminate substrates 300 each having a total of five layers of the magnetic strips 20. In a first layer (the lowermost layer in FIG. 21), two laminate substrates 300 are disposed with the long side portions overlapped with each other. In each of a second layer (the second layer from the bottom in FIG. 21) and a third layer (the third layer from the bottom in FIG. 21), two laminate substrates 300 are aligned without being overlapped (i.e., with the long sides 300L butted together). Two layers of the aligned laminate substrates 300 are stacked in the thickness direction. When viewed in the thickness direction, the laminate substrates 300 in the second layer and the laminate substrates 300 in the third layer are arranged with the positions of the long sides 300L thereof shifted from each other. In a fourth layer (the uppermost layer in FIG. 21), two laminate substrates 300 are disposed with the long side portions overlapped with each other.

Figure 22:
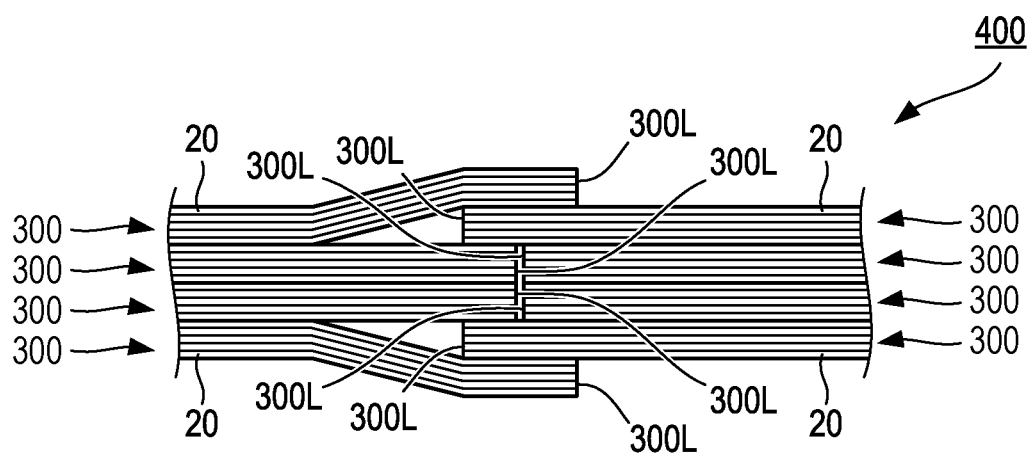
FIG. 22 is a cross-sectional view for explaining a configuration of a multilayer magnetic sheet of Example 9.

As illustrated in FIG. 22, a multilayer magnetic sheet 400 of Example 9 comprises eight laminate substrates 300 each having a total of five layers of the magnetic strips 20. In a first layer (the lowermost layer in FIG. 21), two laminate substrates 300 are disposed with the long side portions overlapped with each other. In each of a second layer (a second layer from the bottom in FIG. 21) and a third layer (a third layer from the bottom in FIG. 21), two laminate substrates 300 are aligned without being overlapped (i.e., with the long sides 300L butted together). Two layers of the aligned laminate substrates 300 are stacked in the thickness direction. When viewed in the thickness direction, the long sides 300L of the laminate substrates 300 in the second layer and the laminate substrates 300 in the third layer are disposed at the same position. In a fourth layer (the uppermost layer in FIG. 21), two laminate substrates 300 are disposed with the long side portions overlapped with each other. Compared to Example 8, the overlapping manner of the long side portions in the first layer is different, and the positions of the long sides 300L in the second and third layers are changed. With the configurations of Examples 8 and 9, the change in the thickness of the multilayer magnetic sheet due to the overlapping of the long side portions can be dispersed to the upper side and the lower side in the stacking direction.

In each of Examples 4 to 9 as well, a multilayer magnetic sheet with a high μ' and a large Q can be obtained. Each of Examples 1 to 9 illustrates the partial structure of the multilayer magnetic sheet, and various configurations can be combined in accordance with the size of the multilayer magnetic sheet (the number of the layers of the stacked magnetic strips and the number of the magnetic strips aligned in the plate shape.)

In the multilayer magnetic sheet 400 illustrated in FIG. 4, one layer of the resin sheet 15 is stacked on each of the laminate substrates 300 disposed at a first stacking end 401 and a second stacking end 402. In other words, the multilayer magnetic sheet 400 is provided with two layers of the resin sheets 15 in total. The resin sheet 15 is bonded to the outermost adhesive layer 10.

The resin sheet can protect the magnetic strip 20 and cover deformed portions formed by overlapping the long side portions of the laminate substrates 300 to improve flatness.

The resin sheet 15 may not be stacked on the first stacking end 401 or the second stacking end 402. The magnetic strip 20 may be exposed, and for example, an amorphous alloy strip, a nanocrystalline alloy strip, another magnetic material, a metal foil such as aluminum, a resin sheet, or the like may be attached to the first stacking end 401 or the second stacking end 402.

With the multilayer magnetic sheet 400 having the above configuration, the multilayer magnetic sheet 400 having a large width and multiple layers is formed with a plurality of laminate substrates 300, each of which comprises the stacked magnetic strips 20, the laminate substrates 300 being aligned in a plate shape and stacked in the thickness direction. Since the plurality of laminate substrates 300 are aligned in a plate shape and are stacked in the thickness direction, the man-hours are less likely to be large compared to a configuration in which the magnetic strips 20 are aligned and stacked.

The long side portions overlap each other between the adjacent laminate substrates 300. In other words, the gaps (magnetic gaps) between the laminate substrates 300 are not aligned (also described as not continuous) when viewed in a direction in which the laminate substrates 300 are stacked. Since the magnetic gap is not continuous when viewed in the direction in which the laminate substrates 300 are stacked, deterioration of magnetic characteristics in the multilayer magnetic sheet 400 can be avoided, and it is easy to obtain the multilayer magnetic sheet 400 with high μ' and large Q.

By setting the width of the multilayer magnetic sheet 400 to 100 mm or more and 1000 mm or less and setting the length to 100 mm or more and 1000 mm or less, the multilayer magnetic sheet 400 can be formed in a desired size.

By making the magnetic strip 20 an amorphous alloy strip or a nanocrystalline alloy strip, the magnetic strip 20 can be made a soft magnetic strip. Also, the magnetic strip 20 can be formed using an alloy.

By including the plurality of small pieces 22 in the magnetic strip 20, the characteristics of the multilayer magnetic sheet 400 can be easily improved. Specifically, when the multilayer magnetic sheet 400 is used as a magnetic body for an inductor, the Q factor can be easily improved. When the multilayer magnetic sheet 400 is used as a magnetic body for magnetic shielding, the eddy current loss can be easily reduced by dividing the current path of the magnetic strip 20.

By providing the adhesive layer 10 between the adjacent magnetic strips 20, the adjacent magnetic strips 20 can be held by the adhesive layer 10.

By providing the two adhesive layers 10 between the adjacent magnetic strips 20, the plurality of plate-shaped laminate substrates 300 can be easily stacked in the thickness direction.

By providing the resin sheet 15 at the first stacking end 401 or the second stacking end 402, the manufactured multilayer magnetic sheet 400 can be easily protected. For example, when conveying the manufactured multilayer magnetic sheet 400, it is easy to prevent damage to the adhesive layer 10 and the magnetic strip 20. It is possible to alleviate the deformed state due to the overlapping of the long side portions.

In addition, an amorphous alloy strip, a nanocrystalline alloy strip, another magnetic material, a metal foil such as aluminum, a resin sheet, or the like may be attached to the first stacking end 401 or the second stacking end 402.

The width A of the region of the adhesive layer 10 where the adhesive 12 is provided is larger than the width B of the magnetic strip 20. Thus, even if meandering occurs in the adhesive layer 10 or the magnetic strip 20 when attaching the magnetic strip 20 to the adhesive layer 10, the adhesive 12 of the adhesive layer 10 can be easily disposed on the entire surface of the magnetic strip 20.

By setting the value obtained by subtracting the width B from the width A to 0.2 mm or more, occurrence of a portion where the adhesive 12 is not disposed on the magnetic strip 20 can be prevented easily when attaching the magnetic strip 20 to the adhesive layer 10. By setting the value obtained by subtracting the width B from the width A to 3 mm or less, increase of the portion of the magnetic sheet 100 where the magnetic strip 20 is not disposed can be prevented easily.

Note that the technical scope of the present disclosure is not limited to the above embodiments, and various modifications can be made without departing from the gist of the present disclosure. For example, the multilayer magnetic sheet 400 according to the present disclosure can be used as an inductive element or the like.

What is claimed is:

1. A multilayer magnetic sheet comprising
laminate substrates, wherein
each of the laminate substrates is formed in a band shape having a short side and a long side and comprises magnetic strips stacked in layers,
the laminate substrates are aligned and arranged in a plate shape in a direction, in which the long sides are adjacent to each other and the short sides extend, and the laminate substrates aligned and arranged in the plate shape are stacked in layers in a thickness direction of the laminate substrates, and
in each two of the laminate substrates arranged adjacent to each other in the same layer in the direction, in which the long sides are adjacent to each other and the short sides extend, long side portions of the laminate substrates including the long sides and vicinities of the long sides overlap each other in the thickness direction.

2. The multilayer magnetic sheet according to claim 1, wherein
- a total of the layers of the magnetic strips stacked in the multilayer magnetic sheet is ten or more,
- at least a part of the multilayer magnetic sheet in a stacking direction of the magnetic strips comprises a layer provided by at least one of the laminate substrates, and
- the long side portions of the laminate substrates overlap each other in at least a part of the multilayer magnetic sheet in the stacking direction of the magnetic strips.

3. The multilayer magnetic sheet according to claim 2, wherein two or more layers of the magnetic strips are stacked in each of the laminate substrates.

4. The multilayer magnetic sheet according to claim 2, wherein the multilayer magnetic sheet has a width of 100 mm or more and 1000 mm or less and a length of 100 mm or more and 1000 mm or less.

5. The multilayer magnetic sheet according to claim 2, wherein the magnetic strips include an amorphous alloy strip or a nanocrystalline alloy strip.

6. The multilayer magnetic sheet according to claim 2, wherein the magnetic strips include a nanocrystalline alloy strip comprising pieces.

7. The multilayer magnetic sheet according to claim 1, wherein two or more layers of the magnetic strips are stacked in each of the laminate substrates.

8. The multilayer magnetic sheet according to claim 1, wherein the multilayer magnetic sheet has a width of 100 mm or more and 1000 mm or less and a length of 100 mm or more and 1000 mm or less.

9. The multilayer magnetic sheet according to claim 1, wherein the magnetic strips include an amorphous alloy strip or a nanocrystalline alloy strip.

10. The multilayer magnetic sheet according to claim 1, wherein the magnetic strips include a nanocrystalline alloy strip comprising pieces.

11. The multilayer magnetic sheet according to claim 1, further comprising an adhesive layer between the adjacent magnetic strips in each of the laminate substrates, the adhesive layer comprising a support formed in a band shape and an adhesive provided on each of a first surface and a second surface of the support.

12. The multilayer magnetic sheet according to claim 11, wherein a width A that is a dimension of the adhesive layer in a direction intersecting a longitudinal direction of the adhesive layer, and a width B that is a dimension of each of the adjacent magnetic strips in a direction intersecting a longitudinal direction of each of the adjacent magnetic strips, satisfy a relationship of 0.2 mm≤(width A−width B)≤3 mm.

13. The multilayer magnetic sheet according to claim 1, further comprising two layers of adhesive layers between the laminate substrates adjacent to each other in a direction in which the laminate substrates are stacked, each of the adhesive layers comprising a support formed in a band shape and an adhesive provided on each of a first surface and a second surface of the support.

14. The multilayer magnetic sheet according to claim 13, wherein a width A that is a dimension of each of the adhesive layers in a direction intersecting a longitudinal direction of each of the adhesive layers, and a width B that is a dimension of the magnetic strips in each of the laminate substrates in a direction intersecting a longitudinal direction of the magnetic strips in each of the laminate substrates, satisfy a relationship of 0.2 mm≤(width A−width B)≤3 mm.

15. The multilayer magnetic sheet according to claim 1, further comprising:
- an adhesive layer comprising a support formed in a band shape and an adhesive provided on each of a first surface and a second surface of the support; and
- a resin sheet that is a film-shaped member formed using a resin and that is bonded to the adhesive layer, wherein
- the adhesive layer and the resin sheet are provided on the magnetic strips at a first stacking end or on the magnetic strips at a second stacking end opposite to the first stacking end in a direction, in which the laminate substrates are stacked.

16. The multilayer magnetic sheet according to claim 15, wherein a width A that is a dimension of the adhesive layer in a direction intersecting a longitudinal direction of the adhesive layer, and a width B that is a dimension of the magnetic strips in a direction intersecting a longitudinal direction of the magnetic strips, satisfy a relationship of 0.2 mm≤(width A−width B)≤3 mm.

* * * * *